United States Patent
Wang et al.

(10) Patent No.: US 12,287,250 B2
(45) Date of Patent: Apr. 29, 2025

(54) ROTATING MULTI-SEGMENT THIN-FILM PRESSURE SENSOR AND ARRANGEMENT METHOD

(71) Applicant: HUNAN CHNTEK SENSOR TECHNOLOGY CO., LTD., Changsha (CN)

(72) Inventors: Guoqiu Wang, Changsha (CN); Jian Huang, Changsha (CN); Cui Chen, Changsha (CN)

(73) Assignee: HUNAN CHNTEK SENSOR TECHNOLOGY CO., LTD., Changsha (CN)

( * ) Notice: Subject to any disclaimer, the term of this patent is extended or adjusted under 35 U.S.C. 154(b) by 269 days.

(21) Appl. No.: 17/926,632

(22) PCT Filed: Jan. 29, 2021

(86) PCT No.: PCT/CN2021/074355
§ 371 (c)(1),
(2) Date: Nov. 21, 2022

(87) PCT Pub. No.: WO2022/121099
PCT Pub. Date: Jun. 16, 2022

(65) Prior Publication Data
US 2023/0184602 A1    Jun. 15, 2023

(30) Foreign Application Priority Data
Dec. 9, 2020  (CN) .......................... 202011426956.X

(51) Int. Cl.
*G01L 1/16*       (2006.01)
*G01B 7/16*       (2006.01)
(Continued)

(52) U.S. Cl.
CPC .............. *G01L 1/2262* (2013.01); *G01B 7/18* (2013.01); *G01L 1/205* (2013.01); *G01L 1/22* (2013.01)

(58) Field of Classification Search
CPC . G01L 19/147; G01L 9/0072; G01L 19/0645; G01L 19/0084; G01L 3/025;
(Continued)

(56) References Cited

U.S. PATENT DOCUMENTS

| | | | | |
|---|---|---|---|---|
| 7,441,470 | B2* | 10/2008 | Morimoto | G01P 15/123 73/862.045 |
| 2006/0174718 | A1* | 8/2006 | Morimoto | G01L 5/1627 73/862.044 |
| 2007/0256469 | A1* | 11/2007 | Okada | G01P 15/18 73/1.38 |

FOREIGN PATENT DOCUMENTS

| | | |
|---|---|---|
| CN | 1257578 A | 6/2000 |
| CN | 1845327 A | 10/2006 |

(Continued)

*Primary Examiner* — Andre J Allen
(74) *Attorney, Agent, or Firm* — Bayramoglu Law Offices LLC

(57) ABSTRACT

A thin-film pressure sensor and an arrangement method thereof are provided. The thin-film pressure sensor includes a flat diaphragm and a first induction unit in the shape of a thin film arranged on the flat diaphragm, where the first induction unit includes m rotating multi-segment resistance wires arranged around the center of a circle of a circular deformation area of the flat diaphragm, m/2 rotating multi-segment resistance wires on one side are connected in series to form a second induction resistor, and m/2 rotating multi-segment resistance wires on the other side are connected in series to form a fourth induction resistor, where m is a multiple of 4; the arrangement method includes arrangement for the first induction unit. The radial strain and the tangential strain of the flat diaphragm can be fully utilized, and the (Continued)

detection sensitivity of the thin-film pressure sensor is improved.

10 Claims, 7 Drawing Sheets

(51) Int. Cl.
*G01L 1/20* (2006.01)
*G01L 1/22* (2006.01)

(58) Field of Classification Search
CPC . G01L 19/0007; G01L 19/0038; G01L 9/042; G01L 9/0073; G01L 9/0075; G01L 9/0054; G01L 9/055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 7/06; G01L 1/2206; G01L 5/228; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/166; G01L 7/185; G01L 1/255; G01L 21/08; G01L 5/0057; G01L 5/1627; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106; G01B 7/18; G01B 7/16; G01B 5/30; G01B 13/00; G01B 13/12; G01B 11/18; G01B 13/10; G01B 2210/64; G01B 3/28; G01B 7/20; G01B 7/14; G01B 11/16; G01B 13/14; G01B 3/22; G01B 7/001; G01B 7/02; G01B 7/24; G01B 9/02; G01B 5/18;

G01B 7/12; G01B 11/165; G01B 13/02;
G01B 13/08; G01B 2290/25; G01B
5/0014; G01B 7/00; G01B 7/012; G01B
7/10; G01B 7/312; G01B 9/02023; G01B
13/18; G01B 13/24; G01B 17/04; G01B
21/32; G01B 3/18; G01B 7/016; G01B
7/13; G01B 7/30; G01B 11/026; G01B
11/105; G01B 11/14; G01B 11/161;
G01B 11/26; G01B 11/30; G01B 13/065;
G01B 13/22; G01B 15/00; G01B 17/02;
G01B 21/045; G01B 21/30; G01B
2210/58; G01B 3/00; G01B 3/004; G01B
3/02; G01B 3/205; G01B 5/0002; G01B
5/028; G01B 5/02; G01B 5/025; G01B
5/06; G01B 5/08; G01B 5/241; G01B
5/28; G01B 7/002; G01B 7/003; G01B
7/004; G01B 7/06; G01B 7/107; G01B
7/22; G01B 7/26; G01B 13/06; G01B
17/00; G01B 21/06; G01B 3/008; G01B
3/1084; G01B 3/1092; G01B 9/021;
H01L 2924/00014; H01L 2224/48091;
H01L 2924/00; H01L 2224/73265; H01L
2224/48247; H01L 2224/48137; H01L
29/84; H01L 2924/00012; H01L
2924/181; H01L 2224/45144; H01L
2924/10253; H01L 2224/48227; H01L
2224/8592; H01L 2224/49171; H01L
2924/0002; H01L 2224/48465; H01L
2924/1815; H01L 2924/3025; H01L
2924/1461; H01L 2224/32225; H01L
2924/15151; H01L 2924/01079; H01L
2224/48472; H01L 24/48; H01L
2224/05554; H01L 24/45; H01L 2924/14;
H01L 2224/45124; H01L 2924/16152;
H01L 21/67253; H01L 2924/01013;
H01L 2224/49175; H01L 2924/01006;
H01L 2924/16151; H01L 2924/01033;
H01L 2924/01078; H01L 2924/01082;
H01L 2924/01322; H01L 2224/32245;
H01L 2924/10155; H01L 2224/16225;
H01L 2924/01005; H01L 2924/13091;
H01L 2224/45099; H01L 24/32; H01L
2924/014; H01L 2924/16195; H01L
2224/48464; H01L 24/49; H01L
2924/1305; H01L 2924/3011; H01L
2224/05553; H01L 23/057; H01L
2924/15153; H01L 2924/19107; H01L
2224/05644; H01L 2924/01014; H01L
2924/01047; H01L 2924/09701; H01L
24/05; H01L 24/73; H01L 29/66007;
H01L 2924/01046; H01L 2924/10158;
H01L 2924/1433; H01L 2924/15311;
H01L 2924/01023; H01L 2924/01029;
H01L 2924/01074; H01L 2924/15165;
H01L 2924/19105; H01L 21/00; H01L
2224/02166; H01L 2224/04042; H01L
2224/05599; H01L 2224/73257; H01L
23/24; H01L 23/49575; H01L 24/24;
H01L 24/80; H01L 24/82; H01L 25/16;
H01L 2924/30105; H01L 2924/351;
H01L 21/2007; H01L 21/6835; H01L
2224/04105; H01L 2224/05568; H01L
2224/05573; H01L 2224/16227; H01L
2224/24137; H01L 2224/48699; H01L
2224/48744; H01L 2224/73204; H01L
24/19; H01L 2924/01024; H01L
2924/01027; H01L 2924/12042; H01L
2924/15156; H01L 2924/15747; H01L
2924/15787; H01L 2924/19042; H01L
21/568; H01L 22/12; H01L 2224/05001;
H01L 2224/45015; H01L 2224/81801;
H01L 2224/8385; H01L 23/5389; H01L
24/83; H01L 27/00; H01L 2924/01004;
H01L 2924/07811; H01L 2924/207; H01L
21/30608; H01L 21/3065; H01L
21/31111; H01L 21/76897; H01L 22/34;
H01L 2224/05124; H01L 2224/16235;
H01L 2224/16245; H01L 2224/32145;
H01L 2224/45147; H01L 2224/45169;
H01L 2224/48644; H01L 2224/81805;
H01L 2224/83805; H01L 23/16; H01L
23/291; H01L 23/3121; H01L 23/49503;
H01L 24/06; H01L 24/85; H01L 25/0652;
H01L 28/20; H01L 29/00; H01L
2924/01015; H01L 2924/01028; H01L
2924/01039; H01L 2924/0105; H01L
2924/01057; H01L 2924/01058; H01L
2924/0106; H01L 2924/01068; H01L
2924/01072; H01L 2924/01073; H01L
2924/12032; H01L 2924/12044; H01L
2924/15192; H01L 2924/19041; H01L
21/67132; H01L 2224/05624; H01L
2224/05647; H01L 2224/08245; H01L
2224/12105; H01L 2224/13; H01L
2224/2612; H01L 2224/26175; H01L
2224/48145; H01L 2224/48147; H01L
2224/48195; H01L 2224/80805; H01L
2224/80893; H01L 2224/80894; H01L
2224/83385; H01L 2224/8389; H01L
2224/92247; H01L 23/04; H01L 23/053;
H01L 23/49811; H01L 23/49877; H01L
23/66; H01L 24/03; H01L 24/08;
24/18; H01L 24/96; H01L 25/167;
27/0688; H01L 2924/00015; H01L
2924/01012; H01L 2924/01067; H01L
2924/01077; H01L 2924/16235; H01L
2924/18162; H01L 31/0203; H01L
21/02126; H01L 21/02203; H01L
21/02216; H01L 21/02274; H01L
21/0273; H01L 21/0334; H01L 21/3105;
H01L 21/311; H01L 21/32053; H01L
21/324; H01L 21/4842; H01L 21/561;
H01L 21/67017; H01L 21/67069; H01L
21/67201; H01L 21/67276; H01L
21/6838; H01L 21/76; H01L 21/76297;
H01L 21/764; H01L 21/7682; H01L
21/78; H01L 22/10; H01L 22/32; H01L
2221/00; H01L 2221/68359; H01L
2221/68363; H01L 2224/023; H01L
2224/02379; H01L 2224/05073; H01L
2224/05155; H01L 2224/05166; H01L
2224/05558; H01L 2224/0558; H01L
2224/056; H01L 2224/05669; H01L
2224/16145; H01L 2224/24011; H01L
2224/24051; H01L 2224/24226; H01L
2224/24227; H01L 2224/24998; H01L
2224/2518; H01L 2224/29099; H01L
2224/45014; H01L 2224/451; H01L
2224/4813; H01L 2224/48225; H01L
2224/48257; H01L 2224/48455; H01L

2224/48463; H01L 2224/48475; H01L
2224/48599; H01L 2224/48624; H01L
2224/48647; H01L 2224/48724; H01L
2224/48747; H01L 2224/48799; H01L
2224/48844; H01L 2224/49; H01L
2224/49052; H01L 2224/49109; H01L
2224/49113; H01L 2224/49173; H01L
2224/72; H01L 2224/73267; H01L
2224/76155; H01L 2224/78313; H01L
2224/78318; H01L 2224/82007; H01L
2224/82102; H01L 2224/82103; H01L
2224/8319; H01L 2224/85051; H01L
2224/85148; H01L 2224/85203; H01L
2224/85206; H01L 2224/85444; H01L
2224/85909; H01L 23/051; H01L 23/08;
H01L 23/10; H01L 23/15; H01L 23/29;
H01L 23/293; H01L 23/315; H01L
23/467; H01L 23/4821; H01L 23/4951;
H01L 23/49513; H01L 23/49541; H01L
23/49548; H01L 23/49805; H01L 23/562;
H01L 23/576; H01L 24/10; H01L 24/26;
H01L 24/76; H01L 24/78; H01L 24/81;
H01L 25/03; H01L 25/041; H01L 25/50;
H01L 27/0248; H01L 27/0629; H01L
27/14643; H01L 27/14685; H01L 28/40;
H01L 29/0657; H01L 29/66; H01L
29/7804; H01L 2924/0001; H01L
2924/00013; H01L 2924/01007; H01L
2924/0101; H01L 2924/01019; H01L
2924/01026; H01L 2924/01038; H01L
2924/0104; H01L 2924/01041; H01L
2924/01042; H01L 2924/01051; H01L
2924/01076; H01L 2924/0133; H01L
2924/04642; H01L 2924/04941; H01L
2924/05042; H01L 2924/07802; H01L
2924/10161; H01L 2924/12036; H01L
2924/1301; H01L 2924/13062; H01L
2924/15174; H01L 2924/1531; H01L
2924/15788; H01L 2924/163; H01L
2924/19043; H01L 2924/206; H01L
2924/30107; H01L 31/00; H01L 33/0025;
H01L 21/02107; H01L 21/02282; H01L
21/314; H01L 21/56; H01L 21/67; H01L
21/67051; H01L 21/823828; H01L
21/823864; H01L 22/00; H01L
2224/0603; H01L 2224/131; H01L
2224/16; H01L 2224/18; H01L
2224/2919; H01L 2224/29191; H01L
2224/48106; H01L 2224/4847; H01L
2224/49105; H01L 2224/82951; H01L
2224/85399; H01L 2225/1023; H01L
2225/1058; H01L 23/047; H01L 23/3128;
H01L 23/481; H01L 23/4952; H01L
23/49558; H01L 23/49861; H01L
23/5226; H01L 23/552; H01L 23/564;
H01L 23/62; H01L 24/09; H01L 24/13;
H01L 24/16; H01L 24/29; H01L 25/105;
H01L 25/165; H01L 29/0669; H01L
29/0673; H01L 29/24; H01L 29/786;
H01L 2924/0665; H01L 2924/10329;
H01L 2924/152; H01L 2924/15331;
H01L 2924/1627; H01L 31/02327; H01L
31/16

USPC .................................................. 73/700–756

See application file for complete search history.

(56) References Cited

FOREIGN PATENT DOCUMENTS

| | | | | |
|---|---|---|---|---|
| CN | 1975358 | A | 6/2007 | |
| CN | 101086456 | A | 12/2007 | |
| CN | 101526411 | A | 9/2009 | |
| CN | 101566514 | A | 10/2009 | |
| CN | 104034454 | A | 9/2014 | |
| CN | 105021341 | A | 11/2015 | |
| CN | 105136376 | A | 12/2015 | |
| CN | 206362468 | U | 7/2017 | |
| CN | 107300435 | A * | 10/2017 | ........... A43B 13/203 |
| CN | 108132115 | A | 6/2018 | |
| CN | 207622684 | U | 7/2018 | |
| CN | 207764760 | U | 8/2018 | |
| CN | 108896235 | A | 11/2018 | |
| CN | 109163828 | A | 1/2019 | |
| CN | 109238524 | A | 1/2019 | |
| CN | 110553576 | A | 12/2019 | |
| CN | 306272572 | S | 1/2021 | |
| CN | 213600274 | U | 7/2021 | |
| CN | 117405267 | A * | 1/2024 | |
| DE | 102022209353 | A1 * | 3/2024 | |
| JP | 2019158807 | A | 9/2019 | |
| KR | 20050103600 | A | 11/2005 | |
| KR | 20150039626 | A | 4/2015 | |

* cited by examiner

ROTATING MULTI-SEGMENT THIN-FILM PRESSURE SENSOR AND ARRANGEMENT METHOD

CROSS REFERENCE TO THE RELATED APPLICATIONS

This application is the national phase entry of International Application No. PCT/CN2021/074355, filed on Jan. 29, 2021, which is based upon and claims priority to Chinese Patent Application No. 202011426956.X, filed on Dec. 9, 2020, the entire contents of which are incorporated herein by reference.

TECHNICAL FIELD

The present disclosure relates to a thin-film resistance strain pressure sensor (referred to as a thin-film pressure sensor for short), in particular to a thin-film pressure sensor and an arrangement method thereof.

BACKGROUND

A sensor is an important technical foundation of new technological revolution and information society, which constitutes the three pillars of information industry together with communication technology and computer technology and is one of the key and core technologies to improve the level of intelligent manufacturing and industrial automation. A pressure sensor is a measuring device that converts the measured pressure into the corresponding electric quantity (such as current, voltage, etc.) which is easy to be accurately processed, which has been widely used. Generally, the working process of the pressure sensor is that an elastic sensitive element first converts the pressure or intensity of pressure into the strain amount or displacement amount, and then converts the non-electric quantity into electric quantity with various conversion elements, and finally modulates the electric signal into an ideal signal output. The quality of the elastic element and the conversion element directly affects the performance and accuracy of the sensor. A resistance pressure sensor is a sensor that converts the non-electric physical pressure into resistance change, which is one of the most widely used sensors at present. The resistance pressure sensor has the unique advantages of simple structure, convenient use and suitability for dynamic and static measurement. A resistance strain pressure sensor has gone through the following three stages: a wire resistance strain pressure sensor, a foil resistance strain pressure sensor and a thin-film resistance strain pressure sensor. In the wire resistance strain pressure sensor and the foil resistance strain pressure sensor, the conversion element is not tightly combined with the sensitive element, the mechanical properties are not good, hysteresis, creep and other phenomena are easy to occur, and the stability is not good, so that the wire resistance strain pressure sensor and the foil resistance strain pressure sensor are gradually replaced by the thin-film resistance strain pressure sensor.

The thin-film strain pressure sensor (referred to as a thin-film pressure sensor for short) takes a metal elastic substrate with excellent performance as a sensitive element, directly sputtering a layer of metal thin film on the substrate, and then making a resistor by photolithography and other techniques. The resistor is used as a conversion element. The conversion principle of the sensor with a thin-film resistor as the conversion element is based on the resistance strain effect of a metal wire. The so-called strain effect refers to a physical phenomenon that metal conductors (resistance wires, thin-film resistance strips, etc.) are deformed (stretched or compressed) under pressure and the resistance value changes with the deformation. At present, the thin-film pressure sensor includes a flat diaphragm and a thin-film-shaped induction resistor arranged on the flat diaphragm, but the induction resistor is generally wired using a simple straight line, which has the problem of low sensitivity.

SUMMARY

The technical problem to be solved by the present disclosure is to provide a thin-film pressure sensor and a arrangement method thereof aiming at the above problems in the prior art. According to the present disclosure, the radial strain and tangential strain of the flat diaphragm can be fully utilized, the detection sensitivity of the thin-film pressure sensor is improved, the strain difference between two sides of the rotating multi-segment resistance wires is smaller, the resistance wire is not easily twisted, the long-term stable combination of the rotating multi-segment resistance wire and the flat diaphragm is facilitated, the service life is longer, and the structure is firmer and more reliable.

In order to solve the above technical problems, the technical scheme used by the present disclosure is as follows:

a thin-film pressure sensor, including a flat diaphragm and a first induction unit in the shape of a thin film arranged on the flat diaphragm, where the first induction unit includes m rotating multi-segment resistance wires arranged around the center of a circle O of a circular deformation area of the flat diaphragm, m/2 rotating multi-segment resistance wires on one side are connected in series to form a second induction resistor R2, and m/2 rotating multi-segment resistance wires on the other side are connected in series to form a fourth induction resistor R4, where m is a multiple of 4.

Preferably, the rotating multi-segment resistance wire is formed by a plurality of linear resistance wires connected in series in sequence, and the angle θ of the linear resistance wire, far from the center of the circle O, of two adjacent linear resistance wires relative to the positive direction of the X axis satisfies the following formula:

$$\theta = \arctan(Y_y/Y_x)$$

where arctan is an arctangent function, and $Y_x$ and $Y_y$ are an x-axis component and a y-axis component of a composite vector of both a radial strain $Y_j$ and a tangential strain $Y_q$ at the intersection of the linear resistance wire far from the center of the circle O and the linear resistance wire near the center of the circle O, respectively.

Preferably, the flat diaphragm is further provided with a second induction unit in the shape of a thin film, the second induction unit includes a first induction resistor R1 and a third induction resistor R3 symmetrically arranged outside the first induction unit around the center of the circle O, the first induction resistor R1 and the third induction resistor R3 both include n radial lines extending beyond the center of the circle O, the n radial lines are connected in series, the first induction resistor R1, the second induction resistor R2, the third induction resistor R3 and the fourth induction resistor R4 are sequentially connected end to end to form a Wheatstone bridge, and a wiring board is led out between any two adjacent resistors.

In addition, the present disclosure further provides an arrangement method of the thin-film pressure sensor, which includes the following steps of arranging a first induction unit:

A1) uniformly marking m points $M_1$ to $M_m$ on an auxiliary circle $R_3$ with the center of a circle O as the center, for any point $M_1$ among the m points $M_1$ to $M_m$: initializing the list Listi corresponding to the point $M_1$ to be empty, determining an endpoint $Q_i$ starting from the point $M_i$, adding the position of the endpoint $Q_i$ to the list Listi, and calculating an angle θ of a composite vector of both a radial strain $Y_j$ and a tangential strain $Y_q$ at the endpoint $Q_i$; where the update number U is 1;

A2) performing the U-th update: extending each endpoint $Q_i$ outward at an angle θ and a step size δ to obtain a new position and adding the position to the list Listi, calculating the angle θ of the composite vector of both the radial strain $Y_j$ and the tangential strain $Y_q$ at the endpoint $Q_i$, calculating the length of a rotating multi-segment resistance wire $S_i$ formed by the trajectory of the endpoint $Q_i$ in the list Listi and the total length of m rotating multi-segment resistance wires $S_1$ to $S_m$; if the update number U is equal to 2, arranging a center proximal transition arc between each pair of rotating multi-segment resistance wires of the second induction resistor R2 and the fourth induction resistor R4 according to the first two positions of the endpoint $Q_i$ in the list Listi, and calculating the length of a center proximal transition arc, so as to determine the total length of m/2 center proximal transition arcs; judging whether the sum of the total length of m rotating multi-segment resistance wires and the total length of m/2 center proximal transition arcs is greater than or equal to 2×L2/m, where L2 is the designed total length of the second induction resistor R2 or the fourth induction resistor R4, if so, judging that the preliminary arrangement of m rotating multi-segment resistance wires $S_1$ to $S_m$ is completed, and jumping to step A3); otherwise, increasing the update number U by 1, and jumping to step A2) to continue the preliminary arrangement;

A3) arranging a center distal transition arc between each pair of rotating multi-segment resistance wires of the second induction resistor R2 and the fourth induction resistor R4 according to the new position of each endpoint $Q_i$, and calculating the length $L_y$ of a center distal transition arc, so as to determine the total length of (m/2−2) center distal transition arcs;

A4) summing and dividing the total length of m rotating multi-segment resistance wires $S_1$ to $S_m$, the total length of m/2 center proximal transition arcs and the total length of (m/2−2) center distal transition arcs by 2 to obtain the estimated total length L2' of the second induction resistor R2 or the fourth induction resistor R4;

A5) comparing the designed total length L2 with the estimated total length L2', if the designed total length L2 is greater than the estimated total length L2', marking the comparison result $B_i$ as ">", if the designed total length L2 is equal to the estimated total length L2', marking the current comparison result $B_i$ as "=", if the designed total length L2 is smaller than the estimated total length L2, marking the current comparison result $B_i$ as "<"; reading the previous comparison result $B_{i-1}$, and if there is no previous comparison result $B_1$, marking the comparison result as "None":

A6) if the current comparison result $B_i$ is ">" and the previous comparison result $B_{i-1}$ is ">" or "None", returning each endpoint $Q_i$ by one step in the corresponding list Listi, reducing the update number U by one, and jumping to step A3); otherwise, jumping to the next step;

A7) if the current comparison result $B_i$ is "<" and the previous comparison result $B_{i-1}$ is "<" or "None", increasing the update number U by 1, and jumping to step A2); otherwise, judging that the search of each endpoint $Q_i$ is completed, and completing the arrangement of the m rotating multi-segment resistance wires $S_1$ to $S_m$.

Preferably, the step of calculating the angle θ of the composite vector of both the radial strain $Y_j$ and the tangential strain $Y_q$ at the endpoint $Q_i$ includes: calculating the radial strain $Y_j$ and the tangential strain $Y_q$ at the endpoint $Q_i$, decomposing the radial strain $Y_j$ and the tangential strain $Y_q$ into components in two directions of x and y axes, respectively, and synthesizing the radial strain and the tangential strain to obtain an x-axis component $Y_x$ and a y-axis component $Y_y$ of a composite vector; where the function expressions for calculating the radial strain $Y_j$ and the tangential strain $Y_q$ at the endpoint $Q_i$ are as follows:

$$Y_j = k(r_1^2 - 3Rq^2)$$

$$Y_q = k(r_1^2 - Rq^2)$$

where k is a material and process coefficient, $r_1$ is the radius of the deformation area on the flat diaphragm, and Rq is the distance between the endpoint $Q_i$ and the center of the circle O; the function expressions for decomposing the radial strain $Y_j$ and the tangential strain $Y_q$ into components in two directions of x and y axes respectively are as follows:

$$Y_{j,x} = k(r_1^2 - 3Rq^2) \times \cos(\beta)$$

$$Y_{j,y} = k(r_1^2 - 3Rq^2) \times \sin(\beta)$$

$$Y_{q,x} = k(r_1^2 - Rq^2) \times \sin(\beta)$$

$$Y_{q,y} = k(r_1^2 - Rq^2) \times \cos(\beta)$$

where β is a polar angle of the endpoint $Q_i$, $Y_{j,x}$ and $Y_{j,y}$ are the components of the radial strain $Y_j$ in two directions of x and y axes, respectively, and $Y_{q,x}$ and $Y_{q,y}$ are the components of the tangential strain $Y_q$ in two directions of x and y axes, respectively, the function expressions for synthesizing the x-axis component $Y_x$, the y-axis component $Y_y$ and the angle θ of the composite vector are as follows:

$$Y_x = Y_{j,x} + Y_{q,x} = k(r_1^2 - 3Rq^2) \times \cos(\beta) + k(r_1^2 - Rq^2) \times \sin(\beta)$$

$$Y_y = Y_{j,y} + Y_{q,y} = Y_{j,y} = k(r_1^2 - 3Rq^2) \times \sin(\beta) + k(r_1^2 - Rq^2) \times \cos(\beta)$$

$$\theta = \arctan(Y_y / Y_x)$$

where arctan is an arctangent function;

in step A2), the step of extending each endpoint $Q_i$ outward at an angle θ and a step size δ to obtain a new position includes: first, updating the x-axis coordinate $Q_x$ and y-axis coordinate $Q_y$ of the endpoint $Q_i$ according to the angle θ and the step size δ of the composite vector, and then calculating the polar coordinates of the new position of the endpoint $Q_i$ according to the updated x-axis coordinate $Q_x$ and y-axis coordinate $Q_y$; where the function expressions for updating the x-axis coordinates $Q_x$ and the y-axis coordinates $Q_y$ of the endpoint $Q_i$ are as follows:

$$Q_x = Q_x + \delta \cos(\theta)$$

$$Q_y = Q_y + \delta \sin(\theta)$$

where δ is the step size, and θ is the angle of the composite vector of both the radial strain $Y_j$ and the tangential strain $Y_q$;

the function expression for calculating the polar coordinates of the new position of the endpoint $Q_i$ is as follows:

$$\beta = \arctan(Q_y / Q_x)$$

$$R_q = \sqrt{Q_x^2 + Q_y^2}$$

where $\beta$ is a polar angle of a new position of the endpoint $Q_i$, $R_q$ is a polar diameter of a new position of the endpoint $Q_i$, and arctan is an arctangent function.

Preferably, in step A2), the step of arranging a center proximal transition arc between each pair of rotating multi-segment resistance wires of the second induction resistor R2 and the fourth induction resistor R4 according to the first two positions of the endpoint $Q_i$ in the list Listi includes:

B1) for the pair of rotating multi-segment resistance wires, drawing a normal perpendicular to the line segment between Listi[0] and Listi[1] of the rotating multi-segment resistance wires $S_i$ by a first element Listi[0] in the list Listi of the rotating multi-segment resistance wires $S_i$ located on the rotating direction side, in which the normal intersects with another rotating multi-segment resistance wire $S_j$ at a point $F_j$;

B2) constructing a semicircle with a radius $r_4$ by taking the line segment between the first element Listi[0] in the list Listi and the point $F_j$ as the diameter, in which the semicircle is taken as the center proximal transition arc between the rotating multi-segment resistance wire $S_i$ and the rotating multi-segment resistance wire $S_j$;

B3) for the rotating multi-segment resistance wire $S_j$, deleting the line segment between the point $F_j$ and the position corresponding to the first element Listj[0] in the list Listj of the rotating multi-segment resistance wire $S_j$ from the arrangement;

B4) searching for the element Listj[$z_1$] closest to the point $F_j$ in the list Listj, extracting the index number $z_1$, subtracting the length $z_1 \times \delta$ from the rotating multi-segment resistance wire $S_j$, and calculating the length $L_j$ of the center proximal transition arc between the rotating multi-segment resistance wire $S_i$ and the rotating multi-segment resistance wire $S_j$ according to $L_j = (r_4 \times \pi)$, where $r_4$ is the radius of the center proximal transition arc, and $\delta$ is the step size.

Preferably, in step A3), the step of arranging a center distal transition arc between each pair of rotating multi-segment resistance wires of the second induction resistor R2 and the fourth induction resistor R4 according to the new position of each endpoint $Q_i$ includes:

C1) for the pair of rotating multi-segment resistance wires, drawing a normal perpendicular to the line segment between Listi[U−2] and Listi[U−1] of the rotating multi-segment resistance wire $S_i$ by taking the position corresponding to the last element Listi[U−1] in the list Listi of the rotating multi-segment resistance wire $S_i$ on the side away from the rotating direction as the starting point, in which the normal intersects with another rotating multi-segment resistance wire $S_j$ at a point $F_y$;

C2) constructing a semicircle with a radius $r_5$ by taking the line segment between the last element Listi[U−1] and the point $F_y$ as the diameter, in which the semicircle is taken as the center distal transition arc between the rotating multi-segment resistance wire $S_i$ and the rotating multi-segment resistance wire $S_j$;

C3) for the rotating multi-segment resistance wire $S_j$, deleting the line segment between the point $F_y$ and the last element Listj[U−1] in the list Listj of the rotating multi-segment resistance wire $S_j$ from the arrangement;

C4) searching the element closest to the point $F_y$ in the list Listj for the element Listj[$z_2$], extracting the index number $z_2$ corresponding to the element Listj[$z_2$], subtracting the length $(U−1−z_2) \times \delta$ from the rotating multi-segment resistance wire $S_j$, and calculating the length $L_y$ of the center distal transition arc between the rotating multi-segment resistance wire $S_i$ and the rotating multi-segment resistance wire $S_j$ according to $L_y = (r_5 \times \pi)$, where $r_5$ is the radius of the center distal transition arc, U is the update number, and $\delta$ is the step size.

Preferably, the arrangement method of the thin-film pressure sensor further includes the following steps of arranging the first induction resistor R1 and the third induction resistor R3:

D1) initializing the included angle $\alpha$ between radial lines, and the initializing the list List to be empty;

D2) determining the number N of radial lines, the distance $r_2$ from the center proximal end of radial lines to the center of a circle O and the strain amount Y according to the included angle $\alpha$, combining the included angle $\alpha$, the number N of radial lines, the distance $r_2$ from the center proximal end of radial lines to the center of a circle O and the strain amount Y into super-elements and adding them into the list List, and marking the strain amount Y corresponding to the included angle $\alpha$ as the original strain amount $Y_0$;

D3) adding the current included angle $\alpha$ to a preset incremental value $\Delta\alpha$ to obtain an increment included angle $\alpha_1$, judging whether there is a super-element corresponding to the value of the increment included angle $\alpha_1$ in the list List, if so, directly assigning the strain amount in the super-element to a first strain amount $Y_1$ corresponding to the increment included angle $\alpha_1$, if not, determining the number N of radial lines, the distance $r_2$ from the center proximal end of radial lines to the center of a circle O and the strain amount Y according to the increment included angle $\alpha_1$, combining the included angle $\alpha$, the number N of radial lines, the distance $r_2$ from the center proximal end of radial lines to the center of a circle O and the strain amount Y into super-elements and adding them into the list List, and marking the strain amount Y corresponding to the included angle $\alpha$, as a first strain amount $Y_1$; subtracting the preset increment value $\Delta\alpha$ from the current included angle $\alpha$ to obtain a decrement included angle $\alpha_2$, judging whether there is a super-element corresponding to the value of the decrement included angle $\alpha_2$ in the list List, if so, directly assigning the strain amount in the super-element to a second strain amount $Y_2$ corresponding to the decrement included angle $\alpha_2$, if not, determining the number N of radial lines, the distance $r_2$ from the center proximal end of radial lines to the center of the circle O and the strain amount Y according to the decrement included angle $\alpha_2$, combining the included angle $\alpha$, the number N of radial lines, the distance $r_2$ from the center proximal end of radial lines to the center of a circle O and the strain amount Y into super-elements and adding them into the list List, and marking the strain amount Y corresponding to the decrement included angle $\alpha_2$ as a second strain amount $Y_2$;

D4) comparing the sizes of the original strain amount $Y_0$, the first strain amount $Y_1$ and the second strain amount $Y_2$: if the first strain amount $Y_1$ is greater than or equal to the original strain amount $Y_0$ and the second strain amount $Y_2$ at the same time, updating the current value of the included angle $\alpha$ to the increment included angle $\alpha_1$, and jumping to step D3); if the second strain amount $Y_2$ is greater than or equal to the original strain amount $Y_0$ and the first strain amount $Y_1$ at the same time, updating the current value of the included angle $\alpha$ to the decrement included angle $\alpha_2$, and jumping to step D3); if the original strain amount $Y_0$ is greater than or equal to the first strain amount $Y_1$ and the second strain amount $Y_2$ at the same time, stopping searching for the value of the included angle $\alpha$, outputting the super-element corresponding to the current included angle $\alpha$ as the result, and exiting.

Preferably, the step of determining the number N of radial lines, the distance $r_2$ from the center proximal end of radial lines to the center of the circle O and the strain amount Y includes:

E1) calculating the distance $r_2$ from the endpoint of the radial line near the center of the circle O to the center of the circle O according to $r_2=d_1/(2\times\sin(\alpha_i/2))$, where $d_1$ is the narrowest distance between radial lines, and $\alpha_i$ is a target angle for determining the number N of radial lines, the distance $r_2$ from the center proximal end of radial lines to the center of the circle O and the strain amount Y;

E2) correcting the distance $r_2$ from the endpoint of the radial line near the center of circle O to the center of circle O according to the following formula;

$$r_2 = \begin{cases} r_2, & \text{if } r_2 > r_f + \Delta 1 \\ r_f + \Delta 1, & \text{else} \end{cases}$$

where $r_f$ is the radius of a circular boundary line with the center of a circle O as the center for positioning both the first induction resistor R1 and the third induction resistor R3, and $\Delta 1$ is a margin parameter;

E3) searching for an even number of suitable radial lines N, so that the lengths of the first induction resistor R1 and the third induction resistor R3 are both close to the designed total length L1;

E4) the function expression of updating the distance $r_2$ from the center proximal end of radial lines to the center of a circle O and updating the distance $r_2$ from the endpoint of radial lines near the center of a circle O to the center of a circle O according to the number N of radial lines is as follows:

$$r_2=(N\times r_1+(r_1\times\sin(\alpha_i/2)\times\pi\times N/2)-L1)/(N-\sin(\alpha_i/2)\times\pi\times(N/2-1))$$

where N is the number of radial lines, $r_1$ is the radius of the deformation area on the flat diaphragm, $r_2$ is the corrected distance from the endpoint of the radial line near the center of a circle O to the center of a circle O, $\alpha_i$ is the target angle, and L1 is the total length of the first induction resistor R1 or the third induction resistor R3;

E5) the function expression of calculating the initial strain amount Y of radial lines according to the distance $r_2$, combining the current included angle $\alpha$, the distance $r_2$, the number N of radial lines and the strain amount Y into super-elements and adding them into the list List, and calculating the strain amount Y is as follows:

$$Y=3Np(1-u^2)/(8Eh^2)\int_{r_2}^{r_1}(r_1^2-3r^2)$$

where Y represents the calculated strain amount, N is the number of radial lines, p is the intensity of pressure, $\mu$ is the Poisson's ratio of the elastic material of the flat diaphragm, E is the elastic modulus, h is the thickness of the flat diaphragm, $r_1$ is the radius of the deformation area on the flat diaphragm, $r_2$ is the distance from the endpoint of the radial line near the center of the circle O to the center of the circle O, and r is the radius of a target position between $r_1$ and $r_2$ in the deformation area on the flat diaphragm relative to the center of the circle O of the flat diaphragm.

Preferably, the step E3) includes:

E3.1) calculating the radius $r_n$ of the inner semicircle Cn and the radius $r_w$ of the outer semicircle Cw according to $r_w=r_1\times\sin(\alpha_i/2)$ and $r_n=r_2\times\sin(\alpha_i/2)$, where $r_1$ is the radius of the deformation area on the flat diaphragm, $r_2$ is the distance from the endpoint of the radial line near the center of a circle O to the center of a circle O, $\alpha_i$ is the target angle, and the radial line is located between the inner semicircle Cn and the outer semicircle Cw;

E3.2) randomly selecting the value of the even number N of radial lines in the specified interval;

E3.3) calculating the estimated length L1' according to the following formula:

$$L1'=N\times(r_1-r_2)+(r_w\times\pi\times N/2)+(r_n\times\pi\times(N/2-1))$$

where N is the number of radial lines, $r_1$ is the radius of the deformation area on the flat diaphragm, $r_2$ is the corrected distance from the endpoint of the radial line near the center of a circle O to the center of a circle O, $r_w$ is the radius of the outer semicircle Cw, and $r_n$ is the radius of the inner semicircle Cn;

E3.4) calculating the difference (L1'–L1) between the estimated length L1' and the designed total length L1, where the designed total length L1 refers to the designed total length of the first induction resistor R1 or the third induction resistor R3, and if the difference (L1'–L1) is greater than or equal to 0 and smaller than the preset threshold value $\Delta 2$, judging that the number N of radial lines ends searching, and jumping to step E4); otherwise, jumping to the next step;

E3.5) judging whether the difference (L1'–L1) is less than 0, if so, updating the value of the number N of radial lines to N=N+2, and jumping to step E3.3); otherwise, if the difference (L1'-L1) is greater than or equal to the preset threshold $\Delta 2$, updating the value of the number N of radial lines to N=N−2, and jumping to step E3.3).

Compared with the prior art, the present disclosure has the following advantages.

1. The first induction unit of the present disclosure includes m rotating multi-segment resistance wires arranged around the center of a circle O of a circular deformation area of the flat diaphragm, the rotating multi-segment resistance wires are arranged in a rotating structure, m/2 rotating multi-segment resistance wires on one side are connected in series to form a second induction resistor R2, and m/2 rotating multi-segment resistance wires on the other side are connected in series to form a fourth induction resistor R4, so that the rotating multi-segment resistance wires are wired along the composite direction of the radial strain and the tangential strain, and the resistance wires have the maximum positive strain under the pressure, which can effectively improve the pressure detection sensitivity of the first induction unit.

2. The first induction unit of the present disclosure includes m rotating multi-segment resistance wires arranged around the center of a circle O of a circular deformation area of the flat diaphragm, and the rotating multi-segment resistance wires are arranged in a rotating structure. Under this arrangement structure, the strain difference between two sides of the rotating multi-segment resistance wires is smaller, the resistance wire is not easily twisted, the long-term stable combination of the rotating multi-segment resistance wire and the flat diaphragm is facilitated, the service life is longer, and the structure is firmer and more reliable.

DETAILED DESCRIPTION OF THE EMBODIMENTS

Figure 1:
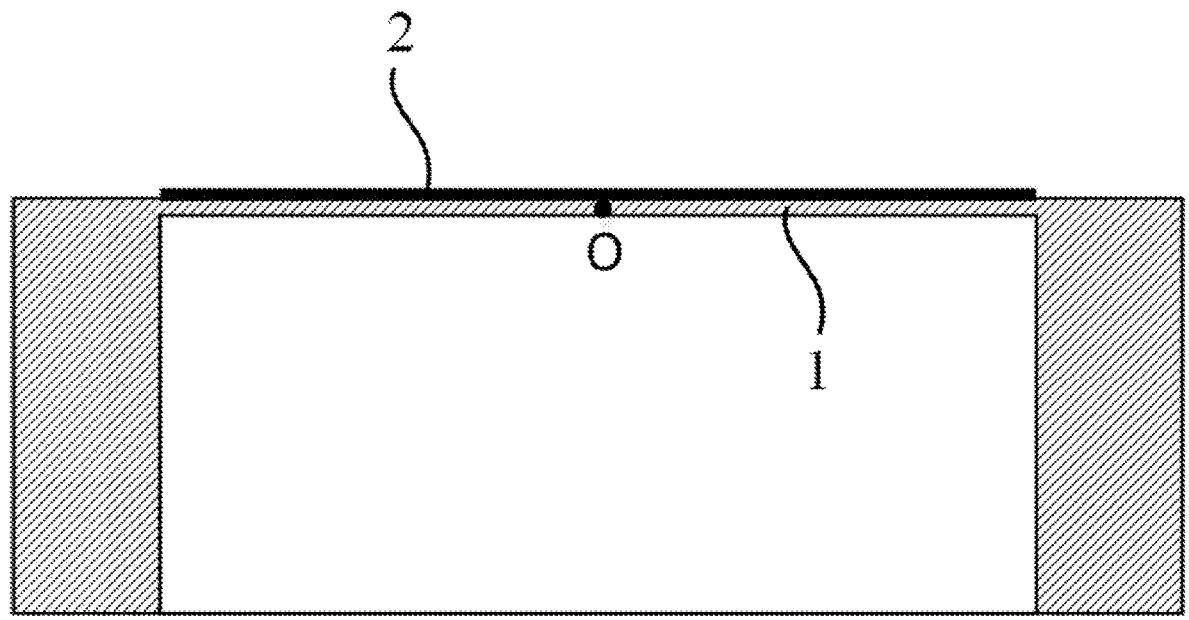
FIG. 1 is a cross-sectional structural diagram of a thin-film pressure sensor according to an embodiment of the present disclosure.
Figure 2A:
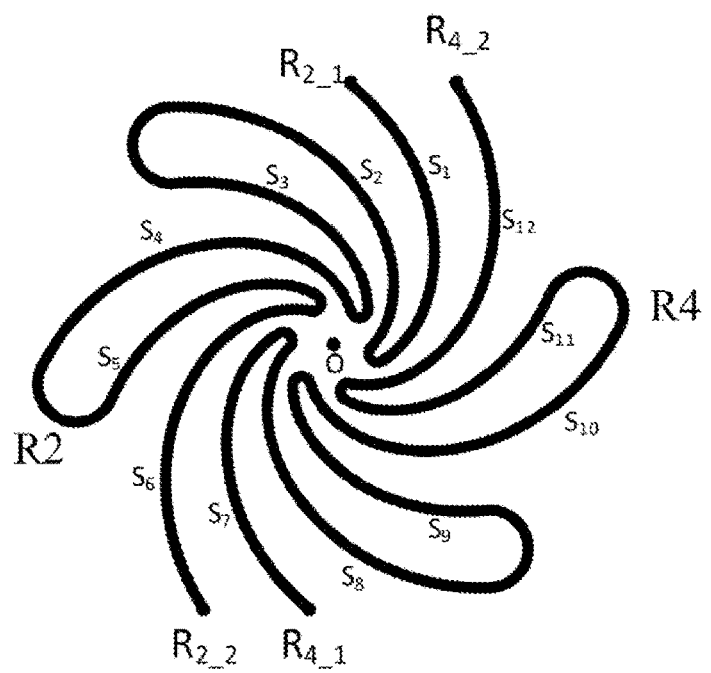
FIG. 2A is a schematic diagram of a planar structure of a first induction unit according to an embodiment of the present disclosure.
Figure 2B:
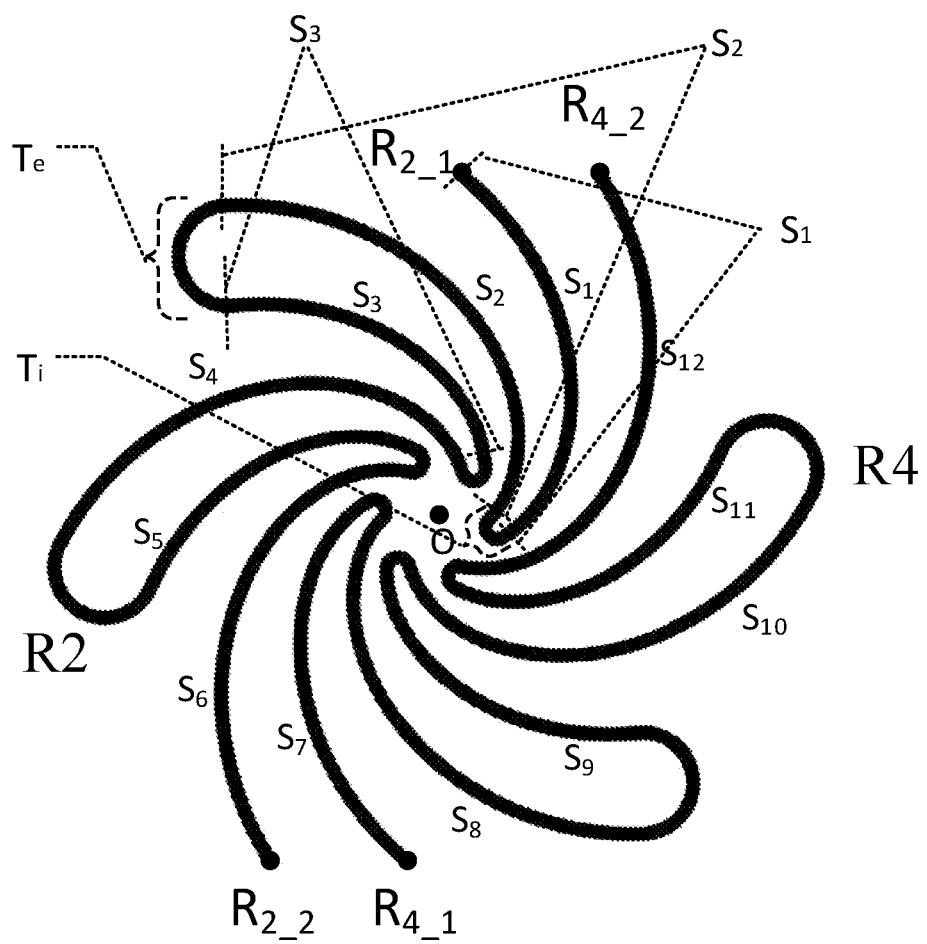
FIG. 2B is an analytical diagram of schematic diagram of a planar structure of a first induction unit according to an embodiment of the present invention.

As shown in FIGS. 1 and 2A, this embodiment provides a thin-film pressure sensor, which includes a flat diaphragm (as shown by reference numeral 1 in FIG. 1) and a first induction unit in the shape of a thin film arranged on the flat diaphragm (as shown by reference numeral 2 in FIG. 1). The first induction unit includes m rotating multi-segment resistance wires arranged around the center of a circle O of a circular deformation area of the flat diaphragm, m/2 rotating multi-segment resistance wires on one side are connected in series to form a second induction resistor R2, and m/2 rotating multi-segment resistance wires on the other side are connected in series to form a fourth induction resistor R4, where m is a multiple of 4. As shown in FIG. 2A, as an alternative embodiment, in this embodiment, the value of m is 12, and there are 12 rotating multi-segment resistance wires, in which six rotating multi-segment resistance wires ($S_1$ to $S_6$) on one side are connected in series to form a second induction resistor R2 (the terminals of which are $R_{2\_1}$ and $R_{2\_2}$, respectively), and six rotating multi-segment resistance wires ($S_7$ to $S_{12}$) on the other side are connected in series to form a fourth induction resistor R4 (the terminals of which are $R_{4\_1}$ and $R_{4\_2}$, respectively). In addition, the value of m can also be selected as other multiples of 4. FIG. 2B is an analytical diagram of FIG. 2A, marking the specific positions of rotating multi-segment resistance wires $S_1$, $S_2$ and $S_3$ in the first induction unit, and marking the transition arcs $T_i$ and $T_e$ used for connecting $S_1$, $S_2$ and $S_3$ in series. It should be noted that a single rotating multi-segment resistance wire (such as $S_1$) is a multi-segment wire that diverges outward from the center and has a slight rotation. Microscopically, the resistance wire is formed by many line segments connected end to end, which is essentially a multi-segment wire. However, the length of each line segment is very small, the resistance wire looks smooth macroscopically.

As shown in FIG. 1, in order to facilitate the installation, a peripheral fixed support structure is arranged around the flat diaphragm. As shown in FIG. 2A, as an alternative embodiment, in this embodiment, the rotating direction of m rotating multi-segment resistance wires is counterclockwise, and the clockwise direction can also be selected as required.

Figure 3A:
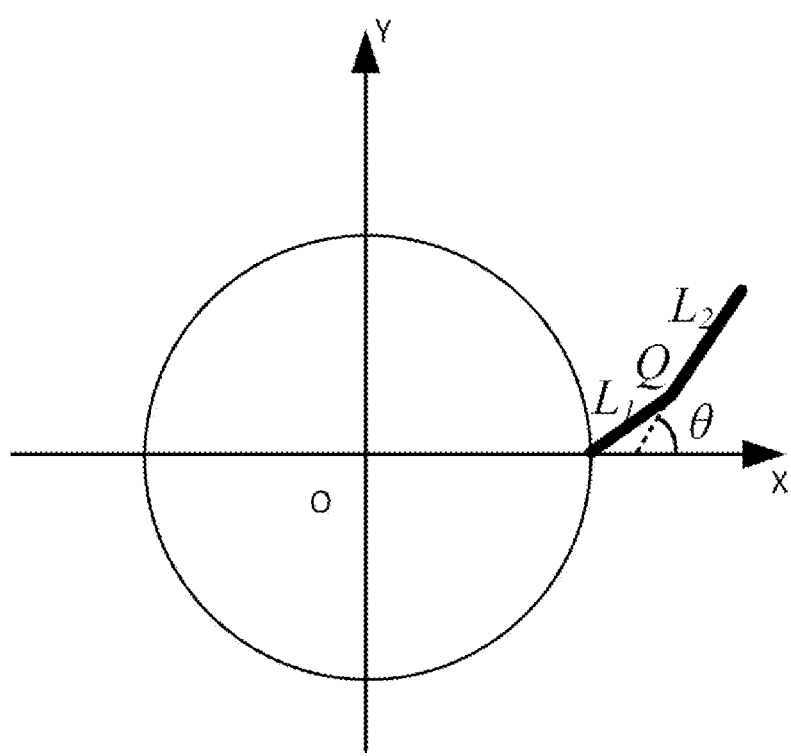
FIG. 3A is a schematic structural diagram of two adjacent linear resistance wires in rotating multi-segment resistance wires according to an embodiment of the present disclosure.

As shown in FIG. 3A, as an alternative embodiment, the rotating multi-segment resistance wire is formed by a plurality of linear resistance wires connected in series in sequence, and the angle θ of the linear resistance wire, far from the center of the circle O, of two adjacent linear resistance wires relative to the positive direction of the X axis satisfies the following formula:

$$\theta = \arctan(Y_y/Y_x)$$

where arctan is an arctangent function, and $Y_x$ and $Y_y$ are an x-axis component and a y-axis component of a composite vector of both a radial strain $Y_j$ and a tangential strain $Y_q$ at the intersection (refer to point Q in FIG. 3A) of the linear resistance wire far from the center of the circle O and the linear resistance wire near the center of the circle O, respectively.

Figure 3B:
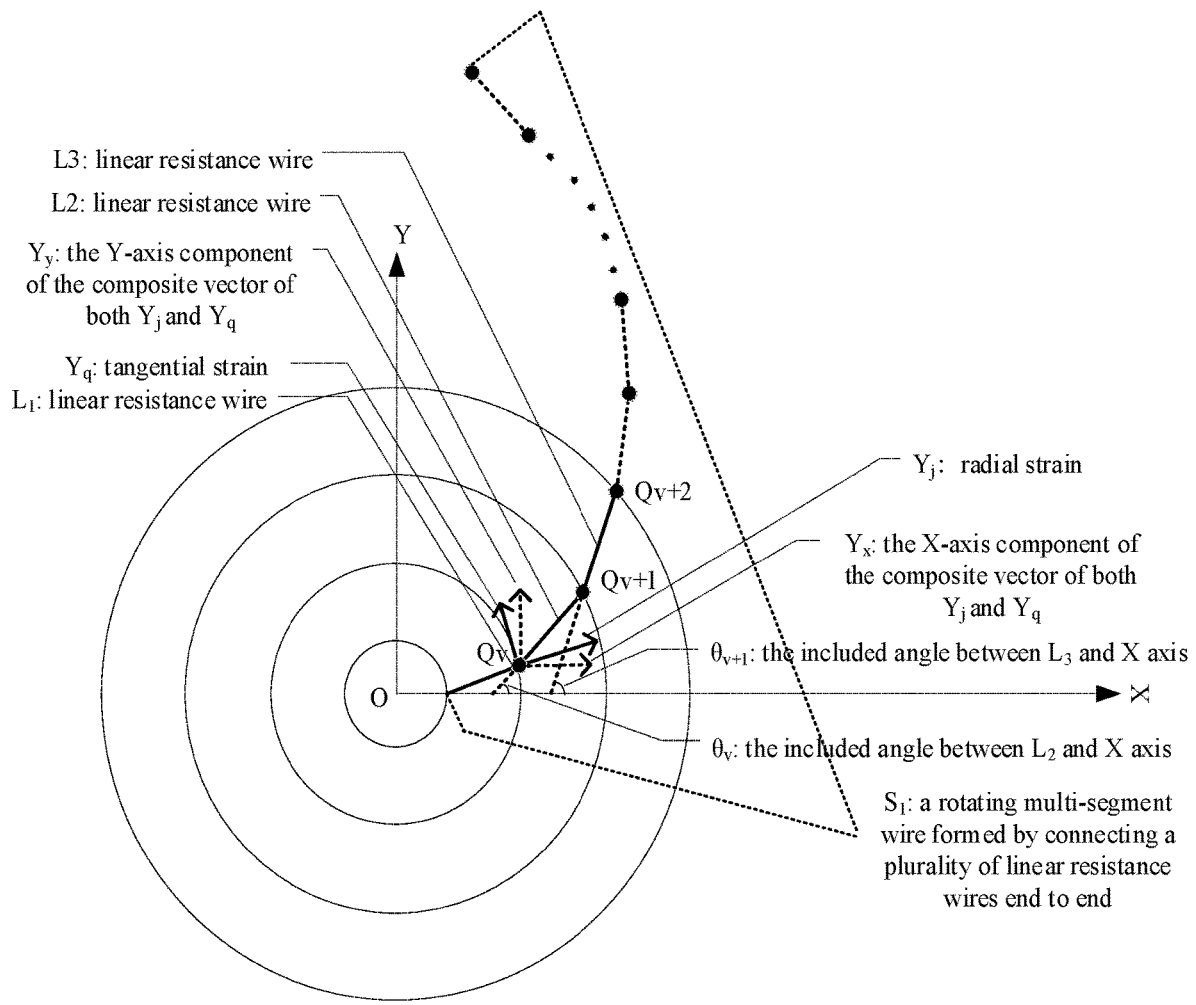
FIG. 3B is a schematic diagram of a microstructure of a rotating multi-segment resistance wire S1 according to an embodiment of the present disclosure (shows how a plurality of linear resistance wires are connected in series to form the rotating multi-segment resistance wire $S_1$).

With the above structure, according to the mechanical characteristics of the elastomer diaphragm under pressure, the thin-film resistors are arranged along the composite direction of the elastomer diaphragm strain, the deformation of the elastomer diaphragm is utilized to the maximum extent, and the sensitivity of the sensor is improved. As shown in FIG. 3A, $L_1$ and $L_2$ are two adjacent linear resistance wires in rotating multi-segment resistance wires, $L_1$ is a linear resistance wire close to the center of the circle O, $L_2$ is a linear resistance wire far from the center of the circle O, and the angle θ of the linear resistance wire $L_2$ far from the center of the circle O relative to the positive direction of the X axis is shown in FIG. 3A. The angle θ is provided, so that the strains on two sides of the linear resistance wire of the rotating multi-segment resistance wires are equal, which will not twist the resistance wire and will facilitate the long-term stable combination of the resistance wire and the substrate. FIG. 3B is a schematic diagram of a microstructure of a rotating multi-segment resistance wire S1 according to the embodiment of the present disclosure, and shows in detail how a plurality of linear resistance wires are connected end to end to form the rotating multi-segment resistance wire $S_1$. $L_1$, $L_2$ and $L_3$ are linear resistance wires, point $Q_v$ is the intersection of $L_1$ and $L_2$, point $Q_{v+1}$ is the intersection of $L_2$ and $L_3$, $\theta_v$ is the included angle between $L_2$ and X axis, θ+1 is the included angle between $L_3$ and X axis, $Y_j$ and $Y_q$ are the radial strain and the tangential strain at point $Q_v$, $Y_y$ and $Y_x$ are the Y-axis component and X-axis component of the composite vector of both $Y_j$ and $Y_q$, respectively, and $\theta_v$ satisfies $\theta_v = \arctan(Y_y/Y_x)$.

It should be noted that when m/2 rotating multi-segment resistance wires on one side are connected in series to form the second induction resistor R2, and m/2 rotating multi-segment resistance wires on the other side are connected in series to form the fourth induction resistor R4, the resistance wires may be connected by a straight line, an arc line or other forms of wires as required. As shown in FIG. 2B, as an alternative embodiment, in order to improve the detection sensitivity of the thin-film pressure sensor, as well as the surge resistance and dynamic signal perception ability, in this embodiment, adjacent rotating multi-segment resistance wires are connected by transition arcs. In order to make it distinguishable, the transition arc near the center of the circle O is marked as the center proximal transition arc, and the transition arc far from the center of the circle O is marked as the center distal transition arc. As shown in FIG. 2B, the rotating multi-segment resistance wire S1 and the rotating multi-segment resistance wire S2 are connected by a center proximal transition arc $T_i$, and the rotating multi-segment resistance wire S2 and the rotating multi-segment resistance wire S3 are connected by a center distal transition arc $T_e$.

Figure 4:
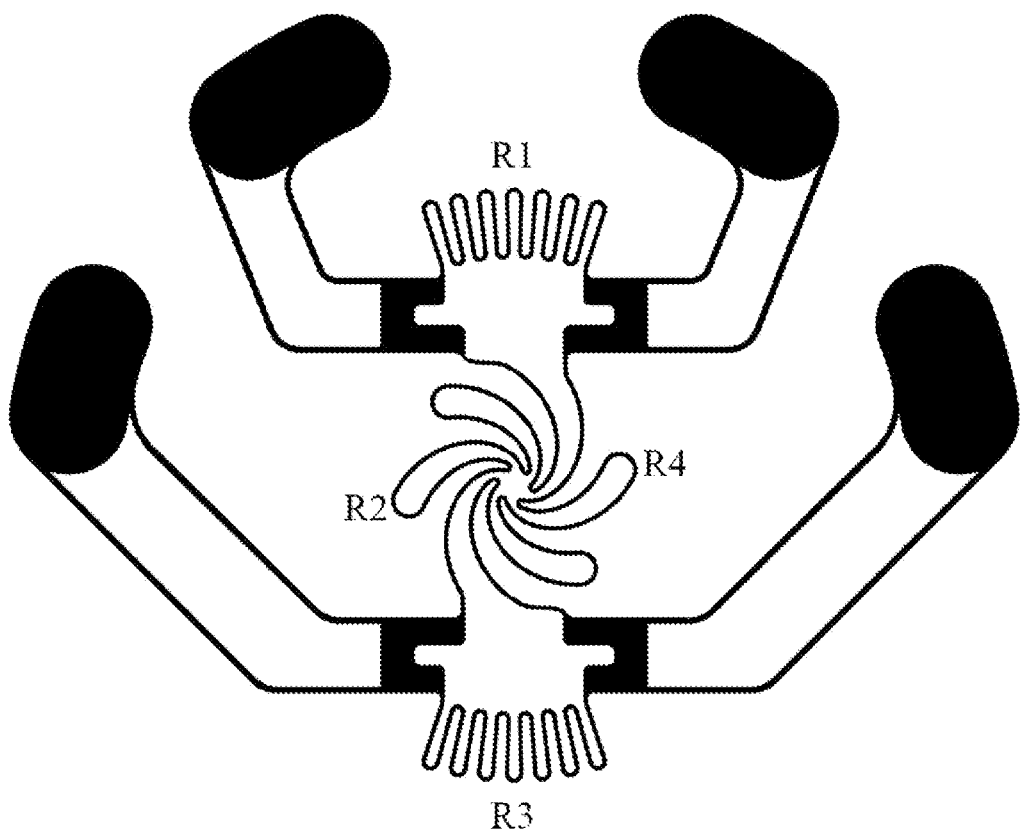
FIG. 4 is a schematic diagram of a planar structure of a first induction unit and a second induction unit according to an embodiment of the present disclosure.

Further, as an alternative embodiment, in order to improve the detection sensitivity of the thin-film pressure sensor, in this embodiment, the flat diaphragm is further provided with a second induction unit in the shape of a thin film. As shown in FIG. 4, the second induction unit includes a first induction resistor R1 and a third induction resistor R3 symmetrically arranged outside the first induction unit around the center of the circle O, the first induction resistor R1 and the third induction resistor R3 both include n radial lines extending beyond the center of the circle O, the n radial lines are connected in series, the first induction resistor R1, the second induction resistor R2, the third induction resistor R3 and the fourth induction resistor R4 are sequentially connected end to end to form a Wheatstone bridge, and a wiring board is led out between any two adjacent resistors. Because the first induction resistor R1 and the third induction resistor R3 are symmetrically arranged outside the first induction unit and include n radial lines extending beyond the center of the circle O, the resistance wires have a negative radial strain and a positive tangential strain under the pressure, both of which make the resistance value smaller. The second induction resistor R2 and the fourth induction resistor R4 of the first induction unit are arranged on the inner side, and are wired along the composite direction of the radial strain and the tangential strain. The resistance wire has the maximum positive strain under the pressure. In this arrangement, the strains on both sides of the resistance wire are equal, which will not twist the resistance wire and will facilitate the long-term stable combination of the resistance wire and the flat diaphragm.

As shown in FIG. 4, as an alternative embodiment, in order to improve the detection sensitivity of the thin film pressure sensor, as well as the surge resistance and dynamic signal perception ability, in this embodiment, n radial lines are connected by transition arcs. In order to make it distinguishable, the transition arc near the center of the circle O is marked as the inner arc line, and the transition arc far from the center of the circle O is marked as the outer arc line.

As shown in FIG. 4, for the convenience of wiring, in this embodiment, any adjacent ones of the first induction resistor R1, the second induction resistor R2, the third induction resistor R3, and the fourth induction resistor R4 are led out of the wiring board through a lead bridge. As an alternative embodiment, in order to improve the detection sensitivity of the thin-film pressure sensor, as well as the surge resistance and the dynamic signal perception ability, in this embodiment, the joints of the first induction resistor R1, the second induction resistor R2, the third induction resistor R3, the fourth induction resistor R4 and the lead bridge are all provided with smooth transition sections. The lead bridge and a pad are connected by leads. All of the first induction resistor R1, the second induction resistor R2, the third induction resistor R3 and the fourth induction resistor R4 are basically thin-film resistor structures with equal width and thickness, and the local line width changes only at the connection with the lead bridge due to the smooth transition section.

The function expression for calculating of the radial strain $\varepsilon_r$ in the circular deformation region of the flat diaphragm is as follows:

$$\varepsilon_r = 3p(1-\mu^2)(R-3r^2)/(8Eh^2) \tag{2}$$

where p is the intensity of pressure of a target position inside the deformation area, μ is the Poisson's ratio of the elastic material used in the flat diaphragm 1, R is the radius of a circular deformation area, r is the radius of a target position inside the deformation area relative to the center of circle O, E is the elastic modulus, and h is the thickness of the flat diaphragm 1. According to formula (2), the critical line of the radial strain of the flat diaphragm can be calculated, which satisfies:

$$R^2 - 3r^2 = 0 \tag{3}$$

According to the above constraints, a circle with a radius $r_f = (\sqrt{3}/3)R$ of the critical line can be obtained. In this embodiment, in this embodiment, the first induction resistor R1 and the third induction resistor R3 are arranged outside the critical line, the second induction resistor R2 and the fourth induction resistor R4 are arranged inside the critical line, and the first induction resistor R1 and the third induction resistor R3 are symmetrically distributed along the X axis.

Figure 5:
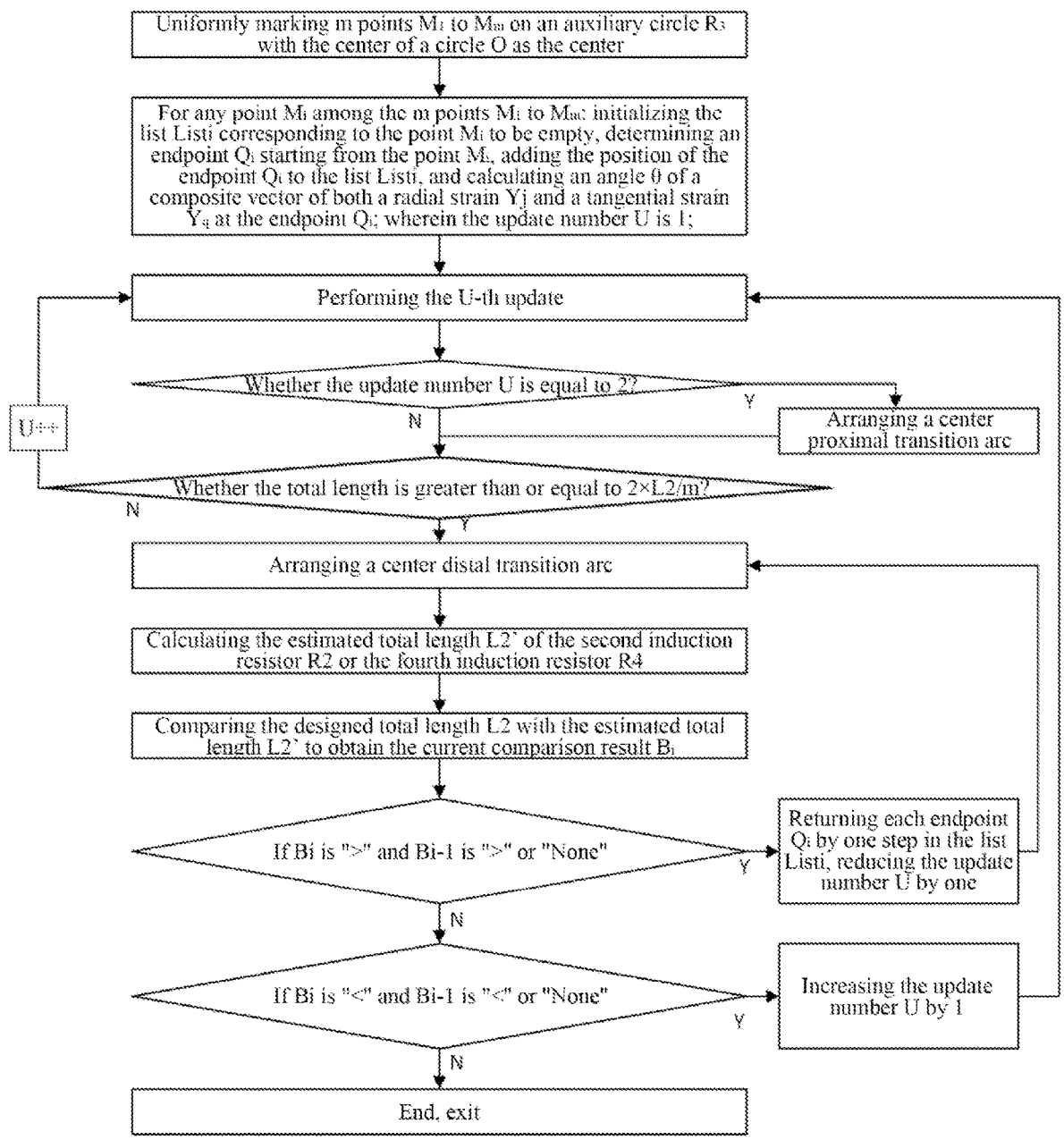
FIG. 5 is a basic flowchart of arranging a first induction unit using an arrangement method according to an embodiment of the present disclosure.

In addition, this embodiment further provides an arrangement method of the thin film pressure sensor described above, as shown in FIG. 5, which includes the following steps of arranging a first induction unit:

A1) uniformly marking m points $M_1$ to $M_m$ on an auxiliary circle $R_3$ with the center of a circle O as the center, for any point $M_1$ among the m points $M_1$ to $M_m$: initializing the list Listi corresponding to the point $M_1$ to be empty, determining an endpoint $Q_i$ starting from the point $M_i$, adding the position of the endpoint $Q_i$ to the list Listi, and calculating an angle θ of a composite vector of both a radial strain $Y_j$ and a tangential strain $Y_q$ at the endpoint $Q_i$; where the update number U is 1;

A2) performing the U-th update: extending each endpoint $Q_i$ outward at an angle θ and a step size δ to obtain a new position and adding the position to the list Listi, calculating the angle θ of the composite vector of both the radial strain $Y_j$ and the tangential strain $Y_q$ at the endpoint $Q_i$, calculating the length of a rotating multi-segment resistance wire $S_i$ formed by the trajectory of the endpoint $Q_i$ in the list Listi and the total length of m rotating multi-segment resistance wires $S_1$ to $S_m$; if the update number U is equal to 2, arranging a center proximal transition arc between each pair of rotating multi-segment resistance wires of the second induction resistor R2 and the fourth induction resistor R4 according to the first two positions of the endpoint $Q_i$ in the list Listi, and calculating the length of a center proximal transition arc, so as to determine the total length of m/2 center proximal transition arcs; judging whether the sum of the total length of m rotating multi-segment resistance wires and the total length of m/2 center proximal transition arcs is greater than or equal to 2×L2/m, where L2 is the designed total length of the second induction resistor R2 or the fourth induction resistor R4, if so, judging that the preliminary arrangement of m rotating multi-segment resistance wires $S_1$ to $S_m$ is completed, and jumping to step A3); otherwise, increasing the update number U by 1, and jumping to step A2) to continue the preliminary arrangement;

A3) arranging a center distal transition arc between each pair of rotating multi-segment resistance wires of the second induction resistor R2 and the fourth induction resistor R4 according to the new position of each endpoint $Q_i$, and calculating the length $L_y$ of a center distal transition arc, so as to determine the total length of (m/2−2) center distal transition arcs;

A4) summing and dividing the total length of m rotating multi-segment resistance wires $S_1$ to $S_m$, the total length of m/2 center proximal transition arcs and the total length of (m/2−2) center distal transition arcs by 2 to obtain the estimated total length L2' of the second induction resistor R2 or the fourth induction resistor R4;

A5) comparing the designed total length L2 with the estimated total length L2', if the designed total length L2 is greater than the estimated total length L2', marking the comparison result $B_i$ as ">", if the designed total length L2 is equal to the estimated total length L2', marking the current comparison result $B_i$ as "=", if the designed total length L2 is smaller than the estimated total length L2, marking the current comparison result $B_i$ as "<"; reading the previous comparison result $B_{i-1}$, and if there is no previous comparison result $B_{i-1}$, marking the comparison result as "None";

A6) if the current comparison result $B_i$ is ">" and the previous comparison result $B_{i-1}$ is ">" or "None", returning each endpoint $Q_i$ by one step in the corresponding list Listi, reducing the update number U by one, and jumping to step A3); otherwise, jumping to the next step;

A7) if the current comparison result $B_i$ is "<" and the previous comparison result $B_{i-1}$ is "<" or "None", increasing the update number U by 1, and jumping to step A2); otherwise, judging that the search of each endpoint $Q_i$ is completed, and completing the arrangement of the m rotating multi-segment resistance wires $S_1$ to $S_m$.

The above steps A1) to A7) have the advantages of small calculation amount and high calculation efficiency, because there is no need to arrange and calculate the center distal transition arc before the sum of the total length of m rotating multi-segment resistance wires and the total length of m/2 center proximal transition arcs is greater than or equal to 2×L2/m. In addition, the method of arranging and calculating the center distal transition arc once every time the endpoint $Q_i$ is updated can also be adopted. The specific steps include:

A1') uniformly marking m points $M_1$ to $M_m$ on an auxiliary circle $R_3$ with the center of a circle O as the center, for any point $M_i$ among the m points $M_1$ to $M_m$: initializing the list Listi corresponding to the point $M_1$ to be empty, determining an endpoint $Q_i$ starting from the point $M_i$, adding the position of the endpoint $Q_i$ to the list Listi, and calculating an angle θ of a composite vector of both a radial strain $Y_j$ and a tangential strain $Y_q$ at the endpoint $Q_i$; where the update number U is 1;

A2') performing the U-th update: extending each endpoint $Q_i$ outward at an angle θ and a step size δ to obtain a new position and adding the position to the list Listi, calculating the angle 9 of the composite vector of both the radial strain $Y_j$ and the tangential strain $Y_q$ at the endpoint $Q_i$, and calculating the length of a rotating multi-segment resistance wire $S_i$ formed by the trajectory of the endpoint $Q_i$ in the list Listi and the total length of m rotating multi-segment resistance wires $S_1$ to $S_m$;

A3') if the update number U is equal to 2, arranging a center proximal transition arc between each pair of rotating multi-segment resistance wires of the second induction resistor R2 and the fourth induction resistor R4 according to the first two positions of the endpoint $Q_i$ in the list Listi, and calculating the length of a center proximal transition arc, so as to determine the total length of m/2 center proximal transition arcs; arranging a center distal transition arc between each pair of rotating multi-segment resistance wires of the second induction resistor R2 and the fourth induction resistor R4 according to the new position of each endpoint $Q_i$, and calculating the length $L_y$ of a center distal transition arc;

A4') summing and dividing the total length of m rotating multi-segment resistance wires $S_1$ to $S_m$, the total length of m/2 center proximal transition arcs and the total length of (m/2−2) center distal transition arcs by 2 to obtain the estimated total length L2' of the second induction resistor R2 or the fourth induction resistor R4;

A5') comparing the designed total length L2 with the estimated total length L2', if the designed total length L2 is greater than or equal to the estimated total length L2', judging that the search of each endpoint $Q_i$ is completed, and completing the arrangement of the m rotating multi-segment resistance wires $S_1$ to $S_m$; otherwise, increasing the update number U by 1, and jumping to step A2').

In this embodiment, the step of calculating the angle θ of the composite vector of both the radial strain $Y_j$ and the tangential strain $Y_q$ at the endpoint $Q_i$ includes: calculating the radial strain $Y_j$ and the tangential strain $Y_q$ at the endpoint $Q_i$, decomposing the radial strain $Y_j$ and the tangential strain $Y_q$ into components in two directions of x and y axes, respectively, and synthesizing the radial strain and the tangential strain to obtain an x-axis component $Y_x$ and a y-axis component $Y_y$ of a composite vector; where the function expressions for calculating the radial strain $Y_j$ and the tangential strain $Y_q$ at the endpoint $Q_i$ are as follows:

$$Y_j = k(r_1^2 - 3Rq^2) \quad (4)$$

$$Y_q = k(r_1^2 - Rq^2) \quad (5)$$

where k is a material and process coefficient, $r_1$ is the radius of the deformation area on the flat diaphragm, and Rq is the distance between the endpoint $Q_i$ and the center of the circle O; the function expressions for decomposing the radial strain $Y_j$ and the tangential strain $Y_q$ into components in two directions of x and y axes respectively are as follows:

$$Y_{j,x} = k(r_1^2 - 3Rq^2) \times \cos(\beta) \quad (6)$$

$$Y_{j,y} = k(r_1^2 - 3Rq^2) \times \sin(\beta) \quad (7)$$

$$Y_{q,x} = k(r_1^2 - Rq^2) \times \sin(\beta) \quad (8)$$

$$Y_{q,y} = k(r_1^2 - Rq^2) \times \cos(\beta) \quad (9)$$

where β is a polar angle of the endpoint $Q_i$, $Y_{j,x}$ and $Y_{j,y}$ are the components of the radial strain $Y_j$ in two directions of x and y axes, respectively, and $Y_{q,x}$ and $Y_{q,y}$ are the components of the tangential strain $Y_q$ in two directions of x and y axes, respectively, the function expressions for synthesizing the x-axis component $Y_x$, the y-axis component $Y_y$ and the angle θ of the composite vector are as follows:

$$Y_x = Y_{j,x} + Y_{q,x} = k(r_1^2 - 3Rq^2) \times \cos(\beta) + k(r_1^2 - Rq^2) \times \sin(\beta) \quad (10)$$

$$Y_y = Y_{j,y} + Y_{q,y} = Y_{j,y} = k(r_1^2 - 3Rq^2) \times \sin(\beta) + k(r_1^2 - Rq^2) \times \cos(\beta) \quad (11)$$

$$\theta = \arctan(Y_y/Y_x) \quad (1)$$

where arctan is an arctangent function;

in step A2), the step of extending each endpoint $Q_i$ outward at an angle θ and a step size δ to obtain a new position includes: first, updating the x-axis coordinate $Q_x$ and y-axis coordinate $Q_y$ of the endpoint $Q_i$ according to the angle θ and the step size δ of the composite vector, and then calculating the polar coordinates of the new position of the endpoint $Q_i$ according to the updated x-axis coordinate $Q_x$ and y-axis coordinate $Q_y$; where the function expressions for updating the x-axis coordinates $Q_x$ and the y-axis coordinates $Q_y$ of the endpoint $Q_i$ are as follows:

$$Q_x'=Q_x+\delta\cos(\theta) \quad (12)$$

$$Q_y'=Q_y+\delta\sin(\theta) \quad (13)$$

where $\delta$ is the step size, and $\theta$ is the angle of the composite vector of both the radial strain $Y_j$ and the tangential strain $Y_q$;

the function expression for calculating the polar coordinates of the new position of the endpoint $Q_i$ is as follows:

$$\beta=\arctan(Q_y'/Q_x') \quad (14)$$

$$R_q=\sqrt{Q_x'^2+Q_y'^2} \quad (15)$$

where $\beta$ is a polar angle of a new position of the endpoint $Q_i$, $R_q$ is a polar diameter of a new position of the endpoint $Q_i$, and arctan is an arctangent function.

In this embodiment, in step A2), the step of arranging a center proximal transition arc between each pair of rotating multi-segment resistance wires of the second induction resistor R2 and the fourth induction resistor R4 according to the first two positions of the endpoint $Q_i$ in the list Listi includes:

B1) for the pair of rotating multi-segment resistance wires, drawing a normal perpendicular to the line segment between Listi[0] and Listi[1] of the rotating multi-segment resistance wires $S_i$ by a first element Listi[0] in the list Listi of the rotating multi-segment resistance wires $S_i$ located on the rotating direction side, in which the normal intersects with another rotating multi-segment resistance wire $S_j$ at a point $F_j$; B2) constructing a semicircle with a radius $r_4$ by taking the line segment between the first element Listi[0] in the list Listi and the point $F_j$ as the diameter, in which the semicircle is taken as the center proximal transition arc between the rotating multi-segment resistance wire $S_i$ and the rotating multi-segment resistance wire $S_j$;

B3) for the rotating multi-segment resistance wire $S_j$, deleting the line segment between the point $F_j$ and the position corresponding to the first element Listj[0] in the list Listj of the rotating multi-segment resistance wire $S_j$ from the arrangement; B4) searching for the element Listj[$z_1$] closest to the point $F_j$ in the list Listj, extracting the index number $z_1$, subtracting the length $z_1\times\delta$ from the rotating multi-segment resistance wire $S_j$, and calculating the length $L_j$ of the center proximal transition arc between the rotating multi-segment resistance wire $S_i$ and the rotating multi-segment resistance wire $S_j$ according to $L_j=(r_4\times\pi)$, where $r_4$ is the radius of the center proximal transition arc, and $\delta$ is the step size.

Figure 6:
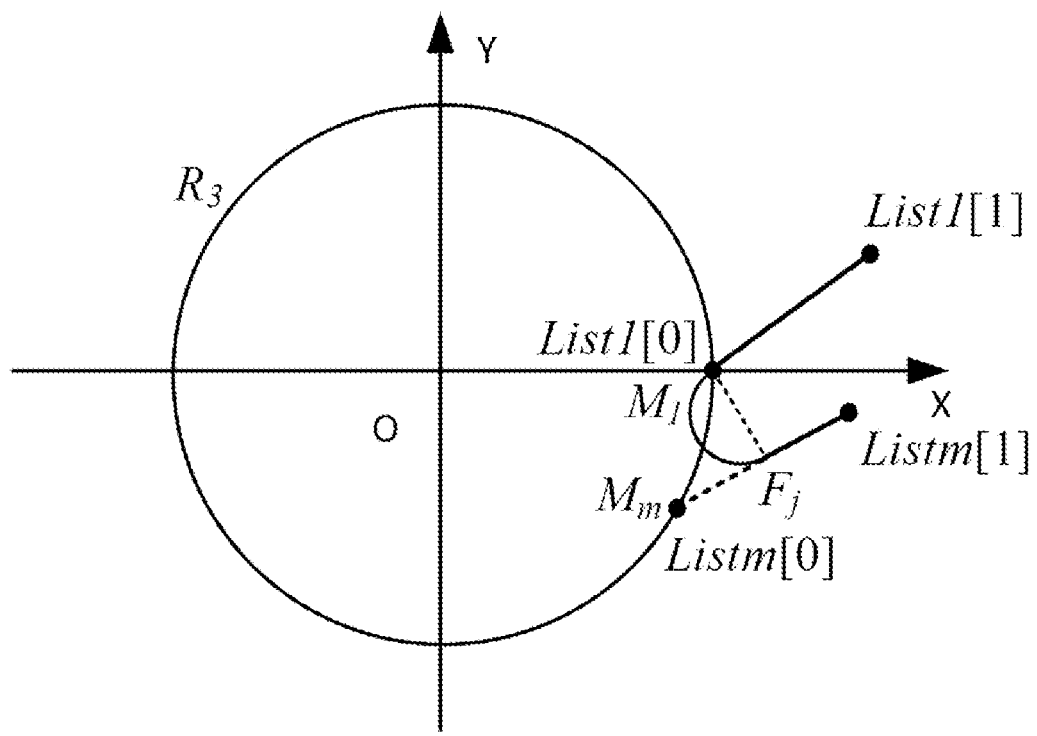
FIG. 6 is a schematic diagram of the principle of arranging a center proximal transition arc using an arrangement method according to an embodiment of the present disclosure.

As shown in FIG. 6, taking the center proximal transition arc between the rotating multi-segment resistance wire $S_1$ and the rotating multi-segment resistance wire $S_m$ as an example, the steps include: (1) selecting to draw a normal perpendicular to the line segment between a first element List1[0] and a second element List1[1] of the rotating multi-segment resistance wires $S_1$ by the first element List1[0] (i.e. $M_i$) of the rotating multi-segment resistance wires $S_1$ located on the rotating direction side, in which the normal intersects with the rotating multi-segment resistance wire $S_m$ at a point $F_j$ (in this embodiment, the center proximal end (i.e., $M_1$) of the rotating multi-segment resistance wire $S_1$ in the counterclockwise direction is selected as the starting point of the normal. Because the rotating multi-segment resistance wire $S_1$ is in the counterclockwise direction of the rotating multi-segment resistance wire $S_m$, the normal starts from the center proximal end of the rotating multi-segment resistance wire $S_1$ and intersects with the rotating multi-segment resistance wire $S_m$); (2) taking the element List1[0] and the point $F_j$ as the endpoints, and making a semicircle with the line segment between the element List1[0] and the point $F_j$ as the diameter, in which the semicircle is the center proximal transition arc between the rotating multi-segment resistance wire $S_1$ and the rotating multi-segment resistance wire $S_m$, and its radius length is marked as $r_4$; (3) for the rotating multi-segment resistance wire $S_m$, deleting the line segment between the point $F_j$ and the position corresponding to the first element Listm[0] (i.e., $M_m$) in the list Listm of the rotating multi-segment resistance wire $S_m$ from the arrangement (referring to the dotted line of FIG. 6); (4) searching the element closest to the point $F_j$ in the list Listm for the element Listm[$z_1$], extracting the index number $z_1$ corresponding to the element Listm[$z_1$], in which assuming that Listm[$z_1$] is closest to the point $F_j$, ($z_1\times\delta$) (approximate calculation) needs to be subtracted from the length of the rotating multi-segment resistance wire $S_m$, for example, in the figure, Listm[1] is closest to the point $F_j$, that is, $\delta$ needs to be subtracted from the length of the rotating multi-segment resistance wire $S_m$, the smaller the step size $\delta$ is, the smaller the error of the approximate calculation value is; and calculating the length $L_j$ of the center proximal transition arc between the rotating multi-segment resistance wire $S_i$ and the rotating multi-segment resistance wire $S_m$ according to $L_j=(r_4\times\pi)$, where $r_4$ is the radius of the center proximal transition arc, and $\delta$ is the step size.

In this embodiment, in step A3), the step of arranging a center distal transition arc between each pair of rotating multi-segment resistance wires of the second induction resistor R2 and the fourth induction resistor R4 according to the new position of each endpoint $Q_i$ includes:

C1) for the pair of rotating multi-segment resistance wires, drawing a normal perpendicular to the line segment between Listi[U−2] and Listi[U−1] of the rotating multi-segment resistance wire $S_i$ by taking the position corresponding to the last element Listi[U−1] in the list Listi of the rotating multi-segment resistance wire $S_i$ on the side away from the rotating direction as the starting point, in which the normal intersects with another rotating multi-segment resistance wire $S_j$ at a point $F_y$;

C2) constructing a semicircle with a radius $r_5$ by taking the line segment between the last element Listi[U−1] and the point $F_y$ as the diameter, in which the semicircle is taken as the center distal transition arc between the rotating multi-segment resistance wire $S_i$ and the rotating multi-segment resistance wire $S_j$;

C3) for the rotating multi-segment resistance wire $S_j$, deleting the line segment between the point $F_y$ and the last element Listj[U−1] in the list Listj of the rotating multi-segment resistance wire $S_j$ from the arrangement;

C4) searching the element closest to the point $F_y$ in the list Listj for the element Listj[$z_2$], extracting the index number $z_2$ corresponding to the element Listj[$z_2$], subtracting the length $(U-1-z_2)\times\delta$ from the rotating multi-segment resistance wire $S_j$, and calculating the length $L_y$ of the center distal transition arc between the rotating multi-segment resistance wire $S_i$ and the rotating multi-segment resistance wire $S_j$ according to $L_y=(r_5\times\pi)$, where $r_5$ is the radius of the center distal transition arc, U is the update number, and $\delta$ is the step size.

Figure 7:
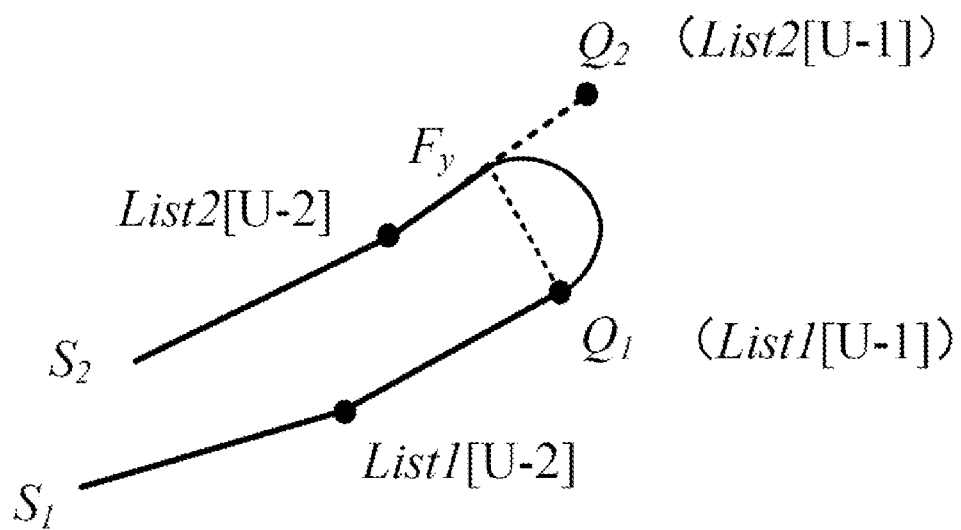
FIG. 7 is a schematic diagram of the principle of arranging a center distal transition arc using an arrangement method according to an embodiment of the present disclosure.

As shown in FIG. 7, taking the center distal transition arc between the rotating multi-segment resistance wire $S_1$ and the rotating multi-segment resistance wire $S_2$ as an example, the steps include: (1) in this embodiment, for the pair of rotating multi-segment resistance wires, selecting the side away from the rotating direction as the rotating multi-segment resistance wire $S_1$ as the rotating multi-segment resistance wire $S_i$, drawing a normal perpendicular to the line segment between List1[U−2] and Listi[U−1] of the rotating multi-segment resistance wire $S_i$ by taking the last element List1[U−1] (Q1) in the list Listi of the rotating multi-segment resistance wire $S_1$ on the side away from the rotating direction as the starting point, in which the normal intersects with another rotating multi-segment resistance wire $S_j$ at a point $F_y$; (2) constructing a semicircle with a radius $r_5$ by taking the line segment between the last element Listi[U−1] and the point $F_y$ as the diameter, in which the semicircle is taken as the center distal transition arc between the rotating multi-segment resistance wire $S_1$ and the rotating multi-segment resistance wire $S_2$; (3) for the rotating multi-segment resistance wire $S_2$, deleting the line segment between the point $F_y$ and the last element List2[U−1] in the list List2 of the rotating multi-segment resistance wire $S_2$ from the arrangement; (4) searching the element closest to the point $F_y$ in the list List2 for the element List2[$z_2$], extracting the index number $z_2$ corresponding to the element List2[$z_2$], in which assuming that List2[$z_2$] is closest to the point $F_j$, $(U-1-z_2) \times \delta$ (approximate calculation) needs to be subtracted from the length of the rotating multi-segment resistance wire S; and calculating the length $L_y$ of the center distal transition arc between the rotating multi-segment resistance wire $S_i$ and the rotating multi-segment resistance wire $S_j$ according to $L_y = (r_5 \times \pi)$.

The resistance of the first induction unit should include the following parts.

A first part: the original length of m rotating multi-segment resistance wires: $U \times \delta \times m$.

A second part: the deleted length (negative number) of the rotating multi-segment resistance wire: (1) when calculating the center proximal transition arc, the length $(z_1 \times \delta)$ needs to be subtracted from the rotating multi-segment resistance wire $S_m$ of each pair of rotating multi-segment resistance wires (corresponding to each center proximal transition arc), and the number of the center proximal transition arcs is m/2, so that $(z_1 \times \delta) \times m/2$ needs to be subtracted from m rotating multi-segment resistance wires in total. (2) When calculating the center distal transition arc, the length $(U-1-z_2) \times \delta$ needs to be subtracted from the rotating multi-segment resistance wire $S_j$ of each pair of rotating multi-segment resistance wires (corresponding to each center distal transition arc), and the number of the center distal transition arcs is (m/2−2), so that $(U-1-z_2) \times \delta \times (m/2-2)$ needs to be subtracted from m rotating multi-segment resistance wires in total.

A third part: the total length of m/2 center proximal transition arcs: $L_j \times m/2$ A fourth part: the total length of (m/2−2) center distal transition arcs: $L_y \times (m/2-2)$.

The resistance of the first induction unit can be expressed as:

$$(U \times \delta \times m) + (L_j - z_1 \times \delta) \times m/2 + (L_y - (U-1-z_2) \times \delta) \times (m/2-2)$$

Therefore, the function expression of summing and dividing the total length of m rotating multi-segment resistance wires $S_1$ to $S_m$, the total length of m/2 center proximal transition arcs and the total length of (m/2−2) center distal transition arcs by 2 to obtain the estimated total length L2' of the second induction resistor R2 or the fourth induction resistor R4 in step A4) is as follows:

$$L2' = ((U \times \delta \times m) + (L_j - z_1 \times \delta) \times m/2 + (L_y - (U-1-z_2) \times \delta) \times (m/2-2))/2$$

As an alternative embodiment, this embodiment further includes the following steps (taking the second induction resistor R2 as an example) of calculating the designed total length L2 of the second induction resistor R2 or the fourth induction resistor R4 prior to step A3): (1) obtaining the resistance value of the second induction resistor R2 when no pressure is applied as $R2^s$; (2) according to the thin-film resistor manufacturing process, obtaining the thickness h of the second induction resistor R2, the resistivity ρ of the thin film and the resistance wire width w of the second induction resistor R2; (3) calculating the designed total length L2 of the second induction resistor R2 according to $L2 = R2^s \times (w \times h)/\rho$.

As an alternative embodiment, in this embodiment, prior to step A1), the step of determining the auxiliary circle $R_3$ is further included: the narrowest distance between any adjacent rotating multi-segment resistance wires is set to $d_2$, and $d_2$ must satisfy the constraint condition $2w < d_2$, where w is the line width of the resistance wire, and then it can be deduced that the radius $r_3$ of the auxiliary circle $R_3$ must satisfy the constraint condition:

$$r_3 \geq d_2/(2 \times \cos(360/2m))$$

where m is the total number of the rotating multi-segment resistance wires. In order to keep a certain margin, in this embodiment, the radius of the auxiliary circle $R_3$ is determined as $r_3$:

$$r_3 \geq d_2/\cos(360/2m)$$

In this embodiment, in step A1), m points $M_1$ to $M_m$ are uniformly marked on the auxiliary circle $R_3$ with the center of a circle O as the center, where $M_1$ is located in the direction of a polar coordinate 0°, $M_2$ is located in the direction of a polar coordinate 360°/m, and so on.

As an alternative embodiment, in this embodiment, the value of the step size δ in step A2) is <L2/1000, where L2 is the designed total length of the second induction resistor R2 or the fourth induction resistor R4.

In step A7), if $B_i$ takes ">" and $B_{i-1}$ takes "<" or "=", the search for the leading endpoints $Q_1 \ldots Q_m$ of the rotating wire at the center distal end stops; if $B_i$ takes "<", $B_{i-1}$ takes "<", or $B_{i-1}$ takes "None", the search for the leading endpoints $Q_1 \ldots Q_m$ of the rotating wire at the center distal end stops; if $B_i$ takes "=", the search for the leading endpoints $Q_1 \ldots Q_m$ of the rotating wire at the center distal end stops.

In addition, as an alternative embodiment, the arrangement method of the thin-film pressure sensor of the embodiment further includes the following steps of arranging the first induction resistor R1 and the third induction resistor R3:

D1) initializing the included angle α between radial lines, and the initializing the list List to be empty;

D2) determining the number N of radial lines, the distance $r_2$ from the center proximal end of radial lines to the center of a circle O and the strain amount Y according to the included angle α, combining the included angle α, the number N of radial lines, the distance $r_2$ from the center proximal end of radial lines to the center of a circle O and the strain amount Y into super-elements and adding them into the list List, and marking the strain amount Y corresponding to the included angle α as the original strain amount $Y_0$;

D3) adding the current included angle α to a preset incremental value Δα to obtain an increment included angle $α_1$, judging whether there is a super-element corresponding to the value of the increment included angle $α_1$ in the list List, if so, directly assigning the strain amount in the super-element to a first strain amount $Y_1$ corresponding to the increment included angle $α_1$, if not, determining the number N of radial lines, the distance $r_2$ from the center proximal end of radial lines to the center of a circle O and the strain amount Y according to the increment included angle $\alpha_1$, combining the included angle $\alpha$, the number N of radial lines, the distance $r_2$ from the center proximal end of radial lines to the center of a circle O and the strain amount Y into super-elements and adding them into the list List, and marking the strain amount Y corresponding to the included angle $\alpha_1$ as a first strain amount $Y_1$; subtracting the preset increment value $\Delta\alpha$ from the current included angle $\alpha$ to obtain a decrement included angle $\alpha_2$, judging whether there is a super-element corresponding to the value of the decrement included angle $\alpha_2$ in the list List, if so, directly assigning the strain amount in the super-element to a second strain amount $Y_2$ corresponding to the decrement included angle $\alpha_2$, if not, determining the number N of radial lines, the distance $r_2$ from the center proximal end of radial lines to the center of the circle O and the strain amount Y according to the decrement included angle $\alpha_2$, combining the included angle $\alpha$, the number N of radial lines, the distance $r_2$ from the center proximal end of radial lines to the center of a circle O and the strain amount Y into super-elements and adding them into the list List, and marking the strain amount Y corresponding to the decrement included angle $\alpha_2$ as a second strain amount $Y_2$; D4) comparing the sizes of the original strain amount $Y_0$, the first strain amount $Y_i$ and the second strain amount $Y_2$: if the first strain amount $Y_i$ is greater than or equal to the original strain amount $Y_0$ and the second strain amount $Y_2$ at the same time, updating the current value of the included angle $\alpha$ to the increment included angle $\alpha_1$, and jumping to step D3); if the second strain amount $Y_2$ is greater than or equal to the original strain amount $Y_0$ and the first strain amount $Y_1$ at the same time, updating the current value of the included angle $\alpha$ to the decrement included angle $\alpha_2$, and jumping to step D3); if the original strain amount $Y_0$ is greater than or equal to the first strain amount $Y_1$ and the second strain amount $Y_2$ at the same time, stopping searching for the value of the included angle $\alpha$, outputting the super-element corresponding to the current included angle $\alpha$ as the result, and exiting.

In this embodiment, the step of determining the number N of radial lines, the distance $r_2$ from the center proximal end of radial lines to the center of the circle O and the strain amount Y includes:

E1) calculating the distance $r_2$ from the endpoint of the radial line near the center of the circle O to the center of the circle O according to $r_2 = d_1/(2\times\sin(\alpha_i/2))$, where $d_1$ is the narrowest distance between radial lines, and $\alpha_i$ is a target angle for determining the number N of radial lines, the distance $r_2$ from the center proximal end of radial lines to the center of the circle O and the strain amount Y;

E2) correcting the distance $r_2$ from the endpoint of the radial line near the center of circle O to the center of circle O according to the following formula;

$$r_2 = \begin{cases} r_2, & \text{if } r_2 > r_f + \Delta 1 \\ r_f + \Delta 1, & \text{else} \end{cases}$$

where $r_f$ is the radius of a circular boundary line with the center of a circle O as the center for positioning both the first induction resistor R1 and the third induction resistor R3, and $\Delta 1$ is a margin parameter;

E3) searching for an even number of suitable radial lines N, so that the lengths of the first induction resistor R1 and the third induction resistor R3 are both close to the designed total length L1;

E4) the function expression of updating the distance $r_2$ from the center proximal end of radial lines to the center of a circle O and updating the distance $r_2$ from the endpoint of radial lines near the center of a circle O to the center of a circle O according to the number N of radial lines is as follows:

$$r_2 = (N \times r_1 + (r_1 \times \sin(\alpha_i/2) \times \pi \times N/2) - L1)/(N - \sin(\alpha_i/2) \times \pi \times (N/2 - 1))$$

where N is the number of radial lines, $r_1$ is the radius of the deformation area on the flat diaphragm, $r_2$ is the corrected distance from the endpoint of the radial line near the center of a circle O to the center of a circle O, $\alpha_i$ is the target angle, and L1 is the total length of the first induction resistor R1 or the third induction resistor R3;

E5) the function expression of calculating the initial strain amount Y of radial lines according to the distance $r_2$, combining the current included angle $\alpha$, the distance $r_2$, the number N of radial lines and the strain amount Y into super-elements and adding them into the list List, and calculating the strain amount Y is as follows:

$$Y = 3N p (1-u^2)/(8Eh^2) \int_{r_2}^{r_1} (r_1^2 - 3r^2)$$

where Y represents the calculated strain amount, N is the number of radial lines, p is the intensity of pressure, $\mu$ is the Poisson's ratio of the elastic material of the flat diaphragm, E is the elastic modulus, h is the thickness of the flat diaphragm, $r_1$ is the radius of the deformation area on the flat diaphragm, $r_2$ is the distance from the endpoint of the radial line near the center of the circle O to the center of the circle O, and r is the radius of a target position between $r_1$ and $r_2$ in the deformation area on the flat diaphragm relative to the center of the circle O of the flat diaphragm.

In this embodiment, the step E3) includes:

E3.1) calculating the radius $r_n$ of the inner semicircle Cn and the radius $r_w$ of the outer semicircle Cw according to $r_w = r_1 \times \sin(\alpha_i/2)$ and $r_n = r_2 \times \sin(\alpha_i/2)$, where $r_1$ is the radius of the deformation area on the flat diaphragm, $r_2$ is the distance from the endpoint of the radial line near the center of a circle O to the center of a circle O, $\alpha_i$ is the target angle, and the radial line is located between the inner semicircle Cn and the outer semicircle Cw;

E3.2) randomly selecting the value of the even number N of radial lines in the specified interval; for example, in this embodiment, randomly selecting the value of the even number N of radial lines between 10 and 20;

E3.3) calculating the estimated length L1' according to the following formula:

$$L1' = N \times (r_1 - r_2) + (r_w \times \pi \times N/2) + (r_n \times \pi \times (N/2 - 1))$$

where N is the number of radial lines, $r_1$ is the radius of the deformation area on the flat diaphragm, $r_2$ is the corrected distance from the endpoint of the radial line near the center of a circle O to the center of a circle O, $r_w$ is the radius of the outer semicircle Cw, and $r_n$ is the radius of the inner semicircle Cn;

E3.4) calculating the difference (L1'−L1) between the estimated length L1' and the designed total length L1, where the designed total length L1 refers to the designed total length of the first induction resistor R1 or the third induction resistor R3, and if the difference (L1'−L1) is greater than or equal to 0 and smaller than the preset threshold value $\Delta 2$, judging that the number N of radial lines ends searching, and jumping to step E4); otherwise, jumping to the next step;

E3.5) judging whether the difference (L1'−L1) is less than 0, if so, updating the value of the number N of radial lines to N=N+2, and jumping to step E3.3); otherwise, if the difference (L1'−L1) is greater than or equal to the preset threshold δ 2, updating the value of the number N of radial lines to N=N−2, and jumping to step E3.3). The preset threshold δ 2>0 is a preset parameter.

As an alternative embodiment, this embodiment further includes the step of calculating the designed total length L1 of the first induction resistor R1 or the third induction resistor R3 (taking the first induction resistor R1 as an example): (1) obtaining the resistance value $R1^s$ of the first induction resistor R1 when no pressure is applied according to the design index; (2) according to the manufacturing process of the thin-film resistor, obtaining the thickness hs of the thin-film resistor R1, the resistivity ρ of the thin film, and the width w of the resistance wire; (3) calculating the designed total length L1 of the first induction resistor R1 according to $L1=R1^s \times (w \times hs)/\rho$.

In addition, this embodiment further provides an arrangement system of the thin film pressure sensor, which includes a computer device. The computer device at least includes a microprocessor and a memory connected with each other, where the microprocessor is programmed or configured to execute the steps of the arrangement method of the thin-film pressure sensor described above.

In addition, this embodiment further provides an arrangement system of the thin film pressure sensor, which includes a computer device. The computer device at least includes a microprocessor and a memory connected with each other, where a computer program programmed or configured to execute the arrangement method of the thin film pressure sensor described above is stored in the memory.

In addition, this embodiment further provides a computer-readable storage medium in which a computer program programmed or configured to execute the arrangement method of the thin film pressure sensor described above is stored.

It should be understood by those skilled in the art that the embodiments of the present disclosure can be provided as a method, a system, or a computer program product. Therefore, the present disclosure can take the form of an entirely hardware embodiment, an entirely software embodiment, or an embodiment combining software and hardware aspects. Furthermore, the present disclosure can take the form of a computer program product implemented on one or more computer readable storage media (including but not limited to a disk storage, a CD-ROM, an optical storage, etc.) in which computer usable program codes are contained. The present disclosure generates a device for realizing the functions specified in one or more flows of the flowchart and/or one or more blocks of the block diagram with reference to the flowchart of the method, the apparatus (system) and the computer program product according to the embodiment of the present disclosure and/or the instructions executed by the processor. These computer program instructions can also be stored in a computer-readable memory that can direct a computer or other programmable data processing devices to operate in a specific way, so that the instructions stored in the computer-readable memory produce an article of manufacture including instruction devices that implement the functions specified in one or more flows of the flowchart and/or one or more blocks of the block diagram. These computer program instructions can also be loaded on a computer or other programmable data processing devices, so that a series of operation steps are executed on the computer or other programmable devices to produce a computer-implemented process, so that the instructions executed on the computer or other programmable devices provide steps for realizing the functions specified in one or more flows of the flowchart and/or one or more blocks of the block diagram.

The above are only the preferred embodiments of the present disclosure, and the scope of protection of the present disclosure is not limited to the above embodiments. All technical solutions under the idea of the present disclosure belong to the scope of protection of the present disclosure. It should be pointed out that for those skilled in the art, several improvements and modifications made without departing from the principle of the present disclosure should also be regarded as the scope of protection of the present disclosure.

What is claimed is:

1. A thin-film pressure sensor, comprising a flat diaphragm and a first induction unit in a shape of a thin film, wherein the first induction unit is arranged on the flat diaphragm, wherein the first induction unit comprises m rotating multi-segment resistance wires arranged around a center of a circle O of a circular deformation area of the flat diaphragm, m/2 rotating multi-segment resistance wires on a first side are connected in series to form an induction resistor R2, and m/2 rotating multi-segment resistance wires on a second side are connected in series to form an additional induction resistor R4, wherein m is a multiple of 4.

2. The thin-film pressure sensor according to claim 1, wherein the rotating multi-segment resistance wire is formed by a plurality of linear resistance wires connected in series in sequence, and an angle θ of the linear resistance wire, far from the center of the circle O, of two adjacent linear resistance wires relative to a positive direction of an X axis satisfies the following formula:

$$\theta = \arctan(Y_y/Y_x)$$

wherein arctan is an arctangent function, and $Y_x$ and $Y_y$ are an x-axis component and a y-axis component of a composite vector of both a radial strain $Y_j$ and a tangential strain $Y_q$ at an intersection of the linear resistance wire far from the center of the circle O and the linear resistance wire adjacent to the center of the circle O, respectively.

3. The thin-film pressure sensor according to claim 2, further comprising a first induction resistor R1, wherein the induction resistor R2 is a second induction resistor R2, and comprising a third induction resistor R3, wherein the additional induction resistor R4 is a fourth induction resistor R4, and wherein the flat diaphragm is further provided with a second induction unit in the shape of the thin film, and the second induction unit comprises the first induction resistor R1 and the third induction resistor R3 symmetrically arranged outside the first induction unit around the center of the circle O, wherein each of the first induction resistor R1 and the third induction resistor R3 comprises n radial lines extending beyond the center of the circle O, the n radial lines are connected in series, the first induction resistor R1, the second induction resistor R2, the third induction resistor R3 and the fourth induction resistor R4 are sequentially connected end to end to form a Wheatstone bridge, and a wiring board is led out between any two adjacent resistors.

4. A arrangement method of the thin-film pressure sensor according to claim 3, comprising the following steps of arranging the first induction unit:

A1) uniformly marking m points $M_1$ to $M_m$ on an auxiliary circle $R_3$ with the center of the circle O as the center, for any point $M_i$ among the m points $M_1$ to $M_m$: initializing a list Listi corresponding to the point $M_i$ to be empty, determining an endpoint $Q_i$ starting from the point $M_i$, adding a position of the endpoint $Q_i$ to the list Listi, and calculating an angle θ of a composite vector of both a radial strain $Y_j$ and a tangential strain $Y_q$ at the endpoint $Q_i$; wherein an update number U is 1;

A2) performing a U-th update: extending each endpoint $Q_i$ outward at an angle θ and a step size δ to obtain a new position and adding the new position to the list Listi, calculating the angle θ of the composite vector of both the radial strain $Y_j$ and the tangential strain $Y_q$ at the endpoint $Q_i$, calculating a length of a rotating multi-segment resistance wire $S_i$ formed by a trajectory of the endpoint $Q_i$ in the list Listi and a total length of the m rotating multi-segment resistance wires $S_1$ to $S_m$; if the update number U is equal to 2, arranging a center proximal transition arc between each pair of rotating multi-segment resistance wires of the second induction resistor R2 and the fourth induction resistor R4 according to first two positions of the endpoint $Q_i$ in the list Listi, and calculating a length of the center proximal transition arc, to determine a total length of m/2 center proximal transition arcs; judging whether a sum of the total length of the m rotating multi-segment resistance wires and the total length of m/2 center proximal transition arcs is greater than or equal to 2×L2/m, wherein L2 is a designed total length of the second induction resistor R2 or the fourth induction resistor R4, if the sum of the total length of the m rotating multi-segment resistance wires and the total length of the m/2 center proximal transition arcs is greater than or equal to 2×L2/m, judging that a preliminary arrangement of the m rotating multi-segment resistance wires $S_1$ to $S_m$ is completed, and jumping to step A3); if the sum of the total length of the m rotating multi-segment resistance wires and the total length of the m/2 center proximal transition arcs is less than 2×L2/m, increasing the update number U by 1, and jumping to step A2) to continue the preliminary arrangement;

A3) arranging a center distal transition arc between each pair of rotating multi-segment resistance wires of the second induction resistor R2 and the fourth induction resistor R4 according to the new position of each endpoint $Q_i$, and calculating a length $L_y$ of the center distal transition arc, to determine a total length of (m/2−2) center distal transition arcs;

A4) summing and dividing the total length of the m rotating multi-segment resistance wires $S_1$ to $S_m$, the total length of the m/2 center proximal transition arcs and the total length of the (m/2−2) center distal transition arcs by 2 to obtain an estimated total length L2' of the second induction resistor R2 or the fourth induction resistor R4;

A5) comparing the designed total length L2 with the estimated total length L2', if the designed total length L2 is greater than the estimated total length L2', marking a current comparison result $B_i$ as ">", if the designed total length L2 is equal to the estimated total length L2', marking the current comparison result $B_i$ as "=", if the designed total length L2 is smaller than the estimated total length L2', marking the current comparison result $B_i$ as "<"; reading a previous comparison result $B_{i-1}$, and if there is no previous comparison result $B_{i-1}$, marking the comparison result as "None":

A6) if the current comparison result $B_i$ is ">" and the previous comparison result $B_{i-1}$ is ">" or "None", returning each endpoint $Q_i$ by one step in the list Listi corresponding to each endpoint, reducing the update number U by one, and jumping to step A3); otherwise, jumping to the next step;

A7) if the current comparison result $B_i$ is "<" and the previous comparison result $B_{i-1}$ is "<" or "None", increasing the update number U by 1, and jumping to step A2); otherwise, judging that a search of each endpoint $Q_i$ is completed, and completing an arrangement of the m rotating multi-segment resistance wires $S_1$ to $S_m$.

5. The arrangement method according to claim 4, wherein the step of calculating the angle θ of the composite vector of both the radial strain $Y_j$ and the tangential strain $Y_q$ at the endpoint $Q_i$ comprises: calculating the radial strain $Y_j$ and the tangential strain $Y_q$ at the endpoint $Q_i$, decomposing the radial strain $Y_j$ and the tangential strain $Y_q$ into components in two directions of x and y axes, respectively, and synthesizing the radial strain and the tangential strain to obtain an x-axis component $Y_x$ and a y-axis component $Y_y$ of a composite vector; wherein function expressions for calculating the radial strain $Y_j$ and the tangential strain $Y_q$ at the endpoint $Q_i$ are as follows:

$$Y_j = k(r_1^2 - 3Rq^2)$$

$$Y_q = k(r_1^2 - Rq^2)$$

wherein k is a material and process coefficient, $r_1$ is a radius of the circular deformation area on the flat diaphragm, and Rq is a distance between the endpoint $Q_i$ and the center of the circle O;

function expressions for decomposing the radial strain $Y_j$ and the tangential strain $Y_q$ into the components in the two directions of x and y axes respectively are as follows:

$$Y_{j,x} = k(r_1^2 - 3Rq^2) \times \cos(\beta)$$

$$Y_{j,y} = k(r_1^2 - 3Rq^2) \times \sin(\beta)$$

$$Y_{q,x} = k(r_1^2 - Rq^2) \times \sin(\beta)$$

$$Y_{q,y} = k(r_1^2 - Rq^2) \times \cos(\beta)$$

wherein β is a polar angle of the endpoint $Q_i$, $Y_{j,x}$ and $Y_{j,y}$ are components of the radial strain $Y_j$ in the two directions of x and y axes, respectively, and $Y_{q,x}$ and $Y_{q,y}$ are components of the tangential strain $Y_q$ in the two directions of x and y axes, respectively, function expressions for synthesizing the x-axis component $Y_x$, the y-axis component $Y_y$ and the angle θ of the composite vector are as follows:

$$Y_x = Y_{j,x} + Y_{q,x} = k(r_1^2 - 3Rq^2) \times \cos(\beta) + k(r_1^2 - Rq^2) \times \sin(\beta)$$

$$Y_y = Y_{j,y} + Y_{q,y} = Y_{j,y} = k(r_1^2 - 3Rq^2) \times \sin(\beta) + k(r_1^2 - Rq^2) \times \cos(\beta)$$

$$\theta = \arctan(Y_y / Y_x)$$

wherein arctan is the arctangent function;

in step A2), the step of extending each endpoint $Q_i$ outward at the angle θ and the step size δ to obtain the new position comprises: first, updating an x-axis coordinate $Q_x$ and a y-axis coordinate $Q_y$ of the endpoint $Q_i$ according to the angle θ and the step size δ of the composite vector to obtain an updated x-axis coordinate $Q_x$ and an updated y-axis coordinate $Q_y$, and then calculating polar coordinates of the new position of the endpoint $Q_i$ according to the updated x-axis coordinate $Q_x$ and the updated y-axis coordinate $Q_y$; wherein function expressions for updating the x-axis coordinates $Q_x$ and the y-axis coordinates $Q_y$ of the endpoint $Q_i$ are as follows:

$Q_x = Q_x + \delta \cos(\theta)$ $Q_y = Q_y + \delta \sin(\theta)$ wherein $\delta$ is the step size, and $\theta$ is the angle of the composite vector of both the radial strain $Y_j$ and the tangential strain $Y_q$;
a function expression for calculating the polar coordinates of the new position of the endpoint $Q_i$ is as follows:

$\beta = \arctan(Q_y/Q_x)$ $R_q = \sqrt{Q_x^2 + Q_y^2}$ wherein $\beta$ is a polar angle of the new position of the endpoint $Q_i$, $R_q$ is a polar diameter of the new position of the endpoint $Q_i$, and arctan is the arctangent function.

6. The arrangement method according to claim 4, wherein in step A2), the step of arranging the center proximal transition arc between each pair of rotating multi-segment resistance wires of the second induction resistor R2 and the fourth induction resistor R4 according to the first two positions of the endpoint $Q_i$ in the list Listi comprises:
B1) for the pair of rotating multi-segment resistance wires, drawing a normal perpendicular to a line segment between Listi[0] and Listi[1] of the rotating multi-segment resistance wires $S_i$ by a first element Listi[0] in the list Listi of the rotating multi-segment resistance wires $S_i$ located on a rotating direction side, wherein the normal intersects with another rotating multi-segment resistance wire $S_j$ at a point $F_j$;
B2) constructing a semicircle with a radius $r_4$ by taking a line segment between the first element Listi[0] in the list Listi and the point $F_j$ as a diameter, wherein the semicircle is taken as the center proximal transition arc between the rotating multi-segment resistance wire $S_i$ and the rotating multi-segment resistance wire $S_j$;
B3) for the rotating multi-segment resistance wire $S_j$, deleting a line segment between the point $F_j$ and a position corresponding to a first element Listj[0] in a list Listj of the rotating multi-segment resistance wire $S_j$ from the arrangement;
B4) searching for an element Listj[$z_1$] closest to the point $F_j$ in the list Listj, extracting an index number $z_1$, subtracting an length $z_1 \times \delta$ from the rotating multi-segment resistance wire $S_j$, and calculating a length $L_j$ of the center proximal transition arc between the rotating multi-segment resistance wire $S_i$ and the rotating multi-segment resistance wire $S_j$ according to $L_j = (r_4 \times \pi)$, wherein $r_4$ is the radius of the center proximal transition arc, and $\delta$ is the step size.

7. The arrangement method according to claim 4, wherein in step A3), the step of arranging the center distal transition arc between each pair of rotating multi-segment resistance wires of the second induction resistor R2 and the fourth induction resistor R4 according to the new position of each endpoint $Q_i$ comprises:
C1) for the pair of rotating multi-segment resistance wires, drawing a normal perpendicular to a line segment between Listi[U−2] and Listi[U−1] of the rotating multi-segment resistance wire $S_i$ by taking a position corresponding to the last element Listi[U−1] in the list Listi of the rotating multi-segment resistance wire $S_i$ on a side away from a rotating direction as a starting point, wherein the normal intersects with another rotating multi-segment resistance wire $S_j$ at a point $F_y$;
C2) constructing a semicircle with a radius $r_5$ by taking a line segment between the last element Listi[U−1] and the point $F_y$ as a diameter, wherein the semicircle is taken as the center distal transition arc between the rotating multi-segment resistance wire $S_i$ and the rotating multi-segment resistance wire $S_j$;
C3) for the rotating multi-segment resistance wire $S_j$, deleting a line segment between the point $F_y$ and the last element Listj[U−1] in a list Listj of the rotating multi-segment resistance wire $S_j$ from the arrangement;
C4) searching an element closest to the point $F_y$ in the list Listj for an element Listj[$z_2$], extracting an index number $z_2$ corresponding to the element Listj[$z_2$], subtracting an length (U−1−$z_2$)×$\delta$ from the rotating multi-segment resistance wire $S_j$, and calculating the length $L_y$ of the center distal transition arc between the rotating multi-segment resistance wire $S_i$ and the rotating multi-segment resistance wire $S_j$ according to $L_y = (r_5 \times \pi)$, wherein $r_5$ is the radius of the center distal transition arc, U is the update number, and $\delta$ is the step size.

8. The arrangement method according to claim 4, further comprising the following steps of arranging a first induction resistor R1 and a third induction resistor R3:
D1) initializing an included angle $\alpha$ between radial lines, and initializing the list List to be empty;
D2) determining a number N of radial lines, a distance $r_2$ from a center proximal end of radial lines to the center of the circle O and a strain amount Y according to the included angle $\alpha$, combining the included angle $\alpha$, the number N of radial lines, the distance $r_2$ from the center proximal end of radial lines to the center of the circle O and the strain amount Y into super-elements and adding the super-elements into the list List, and marking a strain amount Y corresponding to the included angle $\alpha$ as an original strain amount $Y_0$;
D3) adding a current included angle $\alpha$ to a preset incremental value $\Delta\alpha$ to obtain an increment included angle $\alpha_1$, judging whether there is a super-element corresponding to a value of the increment included angle di in the list List, if there is the super-element corresponding to the value of the increment included angle $\alpha_1$ in the list List, directly assigning the strain amount in the super-element to a first strain amount $Y_1$ corresponding to the increment included angle $\alpha_1$, if there is no the super-element corresponding to the value of the increment included angle $\alpha_1$ in the list List, determining the number N of radial lines, the distance $r_2$ from the center proximal end of radial lines to the center of the circle O and the strain amount Y according to the increment included angle $\alpha_1$, combining the included angle $\alpha$, the number N of radial lines, the distance $r_2$ from the center proximal end of radial lines to the center of the circle O and the strain amount Y into the super-elements and adding the super-elements into the list List, and marking a strain amount Y corresponding to the included angle di as a first strain amount $Y_1$; subtracting the preset increment value $\Delta\alpha$ from the current included angle $\alpha$ to obtain a decrement included angle $\alpha_2$, judging whether there is a super-element corresponding to a value of the decrement included angle $\alpha_2$ in the list List, if there is the super-element corresponding to the value of the decrement included angle $\alpha_2$ in the list List, directly assigning the strain amount in the super-element to a second strain amount $Y_2$ corresponding to the decrement included angle $\alpha_2$, if there is no the super-element corresponding to the value of the decrement included angle $\alpha_2$ in the list List, determining the number N of radial lines, the distance 12 from the center proximal end of radial lines to the center of the circle O and the strain amount Y according to the decrement included angle $\alpha_2$, combining the included angle $\alpha$, the number N of radial lines, the distance $r_2$ from the center proximal end of radial lines to the center of the circle O and the strain amount Y into the super-elements and adding the super-elements into the list List, and marking a strain amount Y corresponding to the decrement included angle $\alpha_2$ as the second strain amount $Y_2$;

D4) comparing sizes of the original strain amount $Y_0$, the first strain amount $Y_1$ and the second strain amount $Y_2$: if the first strain amount $Y_1$ is greater than or equal to the original strain amount $Y_0$ and the second strain amount $Y_2$ at the same time, updating a current value of the included angle $\alpha$ to the increment included angle $\alpha_1$, and jumping to step D3); if the second strain amount $Y_2$ is greater than or equal to the original strain amount $Y_0$ and the first strain amount $Y_1$ at the same time, updating the current value of the included angle $\alpha$ to the decrement included angle $\alpha_2$, and jumping to step D3); if the original strain amount $Y_0$ is greater than or equal to the first strain amount $Y_1$ and the second strain amount $Y_2$ at the same time, stopping searching for a value of the included angle $\alpha$, outputting a super-element corresponding to the current included angle $\alpha$ as the result, and exiting.

9. The arrangement method according to claim 8, wherein the step of determining the number N of radial lines, the distance $r_2$ from the center proximal end of radial lines to the center of the circle O and the strain amount Y comprises:

E1) calculating the distance $r_2$ from the endpoint of the radial line adjacent to the center of the circle O to the center of the circle O according to $r_2 = d_1/(2 \times \sin(\alpha_t/2))$, wherein $d_1$ is a narrowest distance between radial lines, and $\alpha_t$ is a target angle for determining the number N of radial lines, the distance $r_2$ from the center proximal end of radial lines to the center of the circle O and the strain amount Y;

E2) correcting the distance $r_2$ from the endpoint of the radial line adjacent to the center of the circle O to the center of the circle O according to the following formula;

$$r_2 = \begin{cases} r_2, & \text{if } r_2 > r_f + \Delta 1 \\ r_f + \Delta 1, & \text{else} \end{cases}$$

wherein $r_f$ is a radius of a circular boundary line with the center of the circle O as a center for positioning each of the first induction resistor R1 and the third induction resistor R3, and $\Delta 1$ is a margin parameter;

E3) searching for an even number of suitable radial lines N, so that lengths of the first induction resistor R1 and the third induction resistor R3 are both close to a designed total length L1;

E4) a function expression of updating the distance $r_2$ from the center proximal end of radial lines to the center of the circle O and updating the distance $r_2$ from the endpoint of radial lines adjacent to the center of the circle O to the center of the circle O according to the number N of radial lines is as follows:

$r_2 = (N \times r_1 + (r_1 \times \sin(\alpha_t/2) \times \pi \times N/2) - L1)/(N - \sin(\alpha_t/2) \times \pi \times (N/2-1))$ wherein N is the number of radial lines, $r_1$ is the radius of the circular deformation area on the flat diaphragm, $r_2$ is a corrected distance from the endpoint of the radial line adjacent to the center of the circle O to the center of the circle O, $\alpha_t$ is the target angle, and L1 is the total length of the first induction resistor R1 or the third induction resistor R3;

E5) a function expression of calculating the initial strain amount Y of radial lines according to the distance $r_2$, combining the current included angle $\alpha$, the distance $r_2$, the number N of radial lines and the strain amount Y into the super-elements and adding the super-elements into the list List, and calculating the strain amount Y is as follows:

$$Y = 3Np(1-u^2)/(8Eh^2) \int_{r_2}^{r_1} (r_1^2 - 3r^2)$$

wherein Y represents the calculated strain amount, N is the number of radial lines, p is an intensity of pressure, $\mu$ is a Poisson's ratio of an elastic material of the flat diaphragm, E is an elastic modulus, h is a thickness of the flat diaphragm, $r_1$ is the radius of the circular deformation area on the flat diaphragm, $r_2$ is the distance from the endpoint of the radial line adjacent to the center of the circle O to the center of the circle O, and r is a radius of a target position between $r_1$ and $r_2$ in the circular deformation area on the flat diaphragm relative to the center of the circle O of the flat diaphragm.

10. The arrangement method according to claim 9, wherein the step E3) comprises:

E3.1) calculating a radius $r_n$ of an inner semicircle Cn and a radius $r_w$ of an outer semicircle Cw according to $r_w = r_1 \times \sin(\alpha_t/2)$ and $r_n = r_2 \times \sin(\alpha_t/2)$, wherein $r_1$ is the radius of the circular deformation area on the flat diaphragm, $r_2$ is the distance from the endpoint of the radial line adjacent to the center of the circle O to the center of the circle O, $\alpha_t$ is the target angle, and the radial line is located between the inner semicircle Cn and the outer semicircle Cw;

E3.2) randomly selecting a value of the even number N of radial lines in a specified interval;

E3.3) calculating an estimated length L1' according to the following formula:

$L1' = N \times (r_1 - r_2) + (r_w \times \pi \times (N/2)) + (r_n \times \pi \times (N/2-1))$ wherein N is the number of radial lines, $r_1$ is the radius of the circular deformation area on the flat diaphragm, $r_2$ is the corrected distance from the endpoint of the radial line adjacent to the center of the circle O to the center of the circle O, $r_w$ is the radius of the outer semicircle Cw, and $r_n$ is the radius of the inner semicircle Cn;

E3.4) calculating a difference (L1'-L1) between the estimated length L1' and the designed total length L1, wherein the designed total length L1 refers to the designed total length of the first induction resistor R1 or the third induction resistor R3, and if the difference (L1'-L1) is greater than or equal to 0 and smaller than a preset threshold value $\Delta 2$, judging that the number N of radial lines ends searching, and jumping to step E4); otherwise, jumping to the next step;

E3.5) judging whether the difference (L1'-L1) is less than 0, if the difference (L1'-L1) is less than 0, updating the value of the number N of radial lines to N=N+2, and jumping to step E3.3); if the difference (L1'-L1) is greater than or equal to the preset threshold $\Delta 2$, updating the value of the number N of radial lines to N=N-2, and jumping to step E3.3).

* * * * *